(12) United States Patent
Inagaki

(10) Patent No.: US 10,771,149 B2
(45) Date of Patent: Sep. 8, 2020

(54) COMMUNICATION BYPASS APPARATUS, METHOD AND NON-TRANSITORY COMPUTER READABLE STORAGE MEDIUM

(71) Applicant: FUJITSU LIMITED, Kawasaki-shi, Kanagawa (JP)

(72) Inventor: Takanori Inagaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/026,248

(22) Filed: Jul. 3, 2018

(65) Prior Publication Data
US 2019/0020408 A1    Jan. 17, 2019

(30) Foreign Application Priority Data

Jul. 11, 2017 (JP) .................................. 2017-135479

(51) Int. Cl.
*H04B 10/03* (2013.01)
*H04B 10/079* (2013.01)
*H04B 10/032* (2013.01)
*H04L 12/703* (2013.01)
(Continued)

(52) U.S. Cl.
CPC ........... *H04B 10/03* (2013.01); *H04B 10/032* (2013.01); *H04B 10/0791* (2013.01); *H04L 41/06* (2013.01); *H04L 43/0823* (2013.01); *H04L 45/28* (2013.01)

(58) Field of Classification Search
CPC .... H04B 10/03; H04B 10/0791; H04B 10/07; H04B 10/0731; H04B 17/00; H04B 3/46; H04L 12/0654; H04L 12/2896; H04L 45/28; H04L 25/08; H04L 41/06;
(Continued)

(56) References Cited

U.S. PATENT DOCUMENTS 5,161,156 A * 11/1992 Baum ................. G06F 11/0712
370/218
5,287,491 A * 2/1994 Hsu ..................... H04L 12/5601
340/2.23
(Continued)

FOREIGN PATENT DOCUMENTS

JP    05-111065    4/1993
JP    11-191754    7/1999
(Continued)

*Primary Examiner* — Warner Wong
(74) *Attorney, Agent, or Firm* — Fujitsu Patent Center

(57) ABSTRACT

An information processing apparatus includes a first and a second node devices, and a control device configured to control data transmission between the first and the second node devices, the control device being coupled to the first node device through a first path group including a plurality of paths and being coupled to the second node device through a second path group including a plurality of paths, the control device is configured to perform a communication test of the first path group and the second path group, and when a first failure is detected in a first path in the first path group, couple a third path other than the first path in the first path group with the first node device, couple a second path in the second path group with the second node device, and couple the third path and the second path with each other.

14 Claims, 18 Drawing Sheets

(51) Int. Cl.
*H04L 12/24* (2006.01)
*H04L 12/26* (2006.01)

(58) Field of Classification Search
CPC ......... H04L 1/00; H04L 49/557; H04L 43/00; H04L 43/0823; H04J 2203/006; H04J 2203/0062
See application file for complete search history.

(56) References Cited

U.S. PATENT DOCUMENTS

| | | | | |
|---|---|---|---|---|
| 5,303,383 | A * | 4/1994 | Neches | G01J 3/06 370/351 |
| 5,522,046 | A * | 5/1996 | McMillen | G01J 3/06 370/217 |
| 5,914,798 | A * | 6/1999 | Liu | H04J 14/0295 370/221 |
| 2006/0013207 | A1 * | 1/2006 | McMillen | G01J 3/06 370/388 |
| 2007/0036544 | A1 * | 2/2007 | Fukashiro | H04J 14/0227 398/19 |
| 2010/0208584 | A1 | 8/2010 | Sone et al. | |
| 2011/0116790 | A1 * | 5/2011 | Sakauchi | H04J 14/0204 398/5 |
| 2014/0298091 | A1 * | 10/2014 | Carlen | H04L 65/80 714/15 |
| 2015/0295674 | A1 * | 10/2015 | Inoue | H04B 10/03 398/83 |
| 2018/0137008 | A1 * | 5/2018 | Maeda | H04L 49/1515 |
| 2019/0146860 | A1 * | 5/2019 | Poustchi | G06F 11/076 714/47.2 |

FOREIGN PATENT DOCUMENTS

| | | |
|---|---|---|
| JP | 2003-258851 | 9/2003 |
| JP | 2005-182485 | 7/2005 |
| JP | 2013-200616 | 10/2013 |
| WO | 2008/044646 | 4/2008 |

* cited by examiner

FIG. 5

ELECTRIC SIGNAL PROCESSING UNIT TABLE ~411

| LINK ##0 | | | |
|---|---|---|---|
| RESOURCE NAME | FAILURE STATE | ALLOCATION STATE | AVAILABLE NUMBER |
| #B0-#C0 | NO | DONE | 2 |
| #B1-#C1 | NO | DONE | |

| LINK ##1 | | | |
|---|---|---|---|
| RESOURCE NAME | FAILURE STATE | ALLOCATION STATE | AVAILABLE NUMBER |
| #B2-#C2 | NO | DONE | 2 |
| #B3-#C3 | NO | DONE | |

ELECTRO-OPTICAL CONVERSION UNIT TABLE ~412

| LINK ##0 | | | |
|---|---|---|---|
| RESOURCE NAME | FAILURE STATE | ALLOCATION STATE | AVAILABLE NUMBER |
| #D0-#E0 | NO | DONE | 2 |
| #D1-#E1 | NO | DONE | |

| LINK ##1 | | | |
|---|---|---|---|
| RESOURCE NAME | FAILURE STATE | ALLOCATION STATE | AVAILABLE NUMBER |
| #D2-#E2 | NO | DONE | 2 |
| #D3-#E3 | NO | DONE | |

| LINK ##0 | | | |
|---|---|---|---|
| LANE NAME | DEGENERACY | ALLOCATED RESOURCE | |
| | | ELECTRIC SIGNAL PROCESSING UNIT | ELECTRO-OPTICAL CONVERSION UNIT |
| LANE 301 | NO | #B0-#C0 | #D0-#E0 |
| LANE 302 | NO | #B1-#C1 | #D1-#E1 |

| LINK ##1 | | | |
|---|---|---|---|
| LANE NAME | DEGENERACY | ALLOCATED RESOURCE | |
| | | ELECTRIC SIGNAL PROCESSING UNIT | ELECTRO-OPTICAL CONVERSION UNIT |
| LANE 311 | NO | #B2-#C2 | #D2-#E2 |
| LANE 312 | NO | #B3-#C3 | #D3-#E3 |

FIG. 8A

ELECTRIC SIGNAL PROCESSING UNIT TABLE — 411

| LINK ##0 | | | |
|---|---|---|---|
| RESOURCE NAME | FAILURE STATE | ALLOCATION STATE | AVAILABLE NUMBER |
| #B0-#C0 | NO | DONE | 2 |
| #B1-#C1 | NO | DONE | |

| LINK ##1 | | | |
|---|---|---|---|
| RESOURCE NAME | FAILURE STATE | ALLOCATION STATE | AVAILABLE NUMBER |
| #B2-#C2 | YES | YET TO BE DONE | 1 |
| #B3-#C3 | NO | DONE | |

ELECTRO-OPTICAL CONVERSION UNIT TABLE — 412

| LINK ##0 | | | |
|---|---|---|---|
| RESOURCE NAME | FAILURE STATE | ALLOCATION STATE | AVAILABLE NUMBER |
| #D0-#E0 | NO | DONE | 2 |
| #D1-#E1 | NO | DONE | |

| LINK ##1 | | | |
|---|---|---|---|
| RESOURCE NAME | FAILURE STATE | ALLOCATION STATE | AVAILABLE NUMBER |
| #D2-#E2 | NO | DONE | 1 |
| #D3-#E3 | YES | YET TO BE DONE | |

| LINK ##0 | | | |
|---|---|---|---|
| LANE NAME | DEGENERACY | ALLOCATED RESOURCE | |
| | | ELECTRIC SIGNAL PROCESSING UNIT | ELECTRO-OPTICAL CONVERSION UNIT |
| LANE 301 | NO | #B0-#C0 | #D0-#E0 |
| LANE 302 | NO | #B1-#C1 | #D1-#E1 |

| LINK ##1 | | | |
|---|---|---|---|
| LANE NAME | DEGENERACY | ALLOCATED RESOURCE | |
| | | ELECTRIC SIGNAL PROCESSING UNIT | ELECTRO-OPTICAL CONVERSION UNIT |
| LANE 311 | NO | #B3-#C3 | #D2-#E2 |
| LANE 312 | YES | | |

ELECTRIC SIGNAL PROCESSING UNIT TABLE — 411

| LINK ##0 | | | |
|---|---|---|---|
| RESOURCE NAME | FAILURE STATE | ALLOCATION STATE | AVAILABLE NUMBER |
| #B0-#C0 | NO | DONE | 2 |
| #B1-#C1 | NO | DONE | |

| LINK ##1 | | | |
|---|---|---|---|
| RESOURCE NAME | FAILURE STATE | ALLOCATION STATE | AVAILABLE NUMBER |
| #B2-#C2 | YES | YET TO BE DONE | 1 |
| #B3-#C3 | NO | DONE | |

ELECTRO-OPTICAL CONVERSION UNIT TABLE — 412

| LINK ##0 | | | |
|---|---|---|---|
| RESOURCE NAME | FAILURE STATE | ALLOCATION STATE | AVAILABLE NUMBER |
| #D0-#E0 | NO | DONE | 2 |
| #D1-#E1 | NO | DONE | |

| LINK ##1 | | | |
|---|---|---|---|
| RESOURCE NAME | FAILURE STATE | ALLOCATION STATE | AVAILABLE NUMBER |
| #D2-#E2 | YES | YET TO BE DONE | 0 |
| #D3-#E3 | YES | YET TO BE DONE | |

| LINK ##0 | | | |
|---|---|---|---|
| LANE NAME | DEGENERACY | ALLOCATED RESOURCE | |
| | | ELECTRIC SIGNAL PROCESSING UNIT | ELECTRO-OPTICAL CONVERSION UNIT |
| LANE 301 | NO | #B0-#C0 | #D0-#E0 |
| LANE 302 | NO | #B3-#C3 | |

| LINK ##1 | | | |
|---|---|---|---|
| LANE NAME | DEGENERACY | ALLOCATED RESOURCE | |
| | | ELECTRIC SIGNAL PROCESSING UNIT | ELECTRO-OPTICAL CONVERSION UNIT |
| LANE 311 | NO | #B1-#C1 | #D1-#E1 |
| LANE 312 | YES | | |

420

COMMUNICATION BYPASS APPARATUS, METHOD AND NON-TRANSITORY COMPUTER READABLE STORAGE MEDIUM

CROSS-REFERENCE TO RELATED APPLICATION

This application is based upon and claims the benefit of priority of the prior Japanese Patent Application No. 2017-135479, filed on Jul. 11, 2017, the entire contents of which are incorporated herein by reference.

FIELD

The embodiment discussed herein is related to an information processing apparatus, a method and a non-transitory computer-readable storage medium.

BACKGROUND

Typically, a super computer has a configuration in which a large number of calculators called nodes are coupled with each other through a network called interconnect. Communication through the interconnect is controlled by an interconnect control unit in each node. The interconnect control unit is also called an interconnect controller (ICC).

Recently, the processing performance of calculators has been significantly improved by highly improved performance of central processing units (CPUs). This has led to increase in the amount of data communicated between CPUs, and accordingly, a bandwidth desired for the interconnect has been increasing. It is difficult to obtain the desired bandwidth by electrical communication through metal wires, and thus the interconnect is increasingly achieved by optical communication, which provides a large bandwidth. The optical communication is achieved by using a conversion element configured to convert light and electricity, which is called an optical module. The optical module is roughly divided into two parts, a circuit part configured to communicate an electric signal with the interconnect control unit, and an optical element part configured to convert optical and electric signals.

A path through which nodes are coupled is called a link. Typically, one link includes a plurality of lanes as communication paths through which signals are transmitted and received. The interconnect control unit is provided with ports in a number equal to the number of links, and the ports are coupled with nodes different from each other.

The interconnect control unit has functionality called dynamic lane degeneracy. The dynamic lane degeneracy is functionality of cutting off, when failure is detected at a certain link, the problematic lane in the link and continuing communication operation by using any lane in order. For example, consider a case in which failure occurs at a light receiving element used by a particular link. In this case, the interconnect control unit detects an error such as excess of the number of times of packet retransmission over a defined value at the particular link. Having detected such an error, from which it is determined to be difficult to continue communication, the interconnect control unit executes lane degeneracy on the particular link. At execution of the lane degeneracy, the interconnect control unit determines which lane is to be cut off by using an error counter prepared for each lane. Specifically, the interconnect control unit compares count values of lanes and the values of the error counters, and determines a cutoff target to be any lane for which a larger number of errors are detected. Then, when a particular lane is cut off, the interconnect control unit executes link re-initialization to, for example, activate any lane other than the lane cut off.

For example, consider a case in which a particular link includes two lanes. When an error from which it is determined to be difficult to continue communication is detected at one of the lanes while the other lane is already degenerated, the particular link has no available lane. In this case, the interconnect control unit performs processing to deactivate on the particular link and cuts off the particular link from an in-system calculation resource.

Less research and development have been achieved in optical communication than in electrical communication, and the optical module tends to have a high failure rate as compared to any other device configured to process electric signals but not optical signals. For example, the optical module has a unique failure mode called sudden death, in which light emission from a light-emitting element suddenly is stopped. Moreover, recently, the amount of heat generation at the optical module has been increasing due to downsizing and increased density of the optical module as well as increase of communication speed in response to a request for increased interconnect transmission capacity. It is known that heat generation accelerates failure of the device, and is a factor of increase of the failure rate. For these reasons, the optical module tends to be more likely to fail than any other device, which is a main factor of the lane degeneracy and the link deactivation at interconnect.

Technologies as described below are disclosed as technologies related to such communication failure at, for example, a link or a lane. For example, in a conventional technology, the link deactivation is avoided by performing reallocation of physical and logic lanes when restriction exists on the number of logic lanes or a lane width for which degeneracy is possible. In another conventional technology, the state of lane degeneracy is resolved by using an unused physical lane. In another conventional technology, a path is divided into partial paths, failure detection is performed at each partial path, and switching is performed to a path bypassing a partial path at which failure has occurred. In another conventional technology, resources of paths are shared based on priority information provided to the paths. In another conventional technology of determining a place where failure occurs, a particular interval is specified on an optical path to perform a conduction test on a specified interval by using an optical signal. In another conventional technology, a multi-stage connection network is formed to perform communication through a bypass switch when a switch has failed. A citation list includes Japanese Laid-open Patent Publication Nos. 2005-182485, 2013-200616, 2003-258851, 11-191754, and 05-111065, International Publication Pamphlet No. WO 2008/044646.

SUMMARY

According to an aspect of the invention, an information processing apparatus includes a first node device, a second node device, and a control device configured to control data transmission between the first node device and the second node device, the control device being coupled to the first node device through a first path group including a plurality of paths and being coupled to the second node device through a second path group including a plurality of paths, the control device includes a memory, and a processor coupled to the memory and configured to perform a communication test of the first path group and the second path group, and when a first failure is detected in a first path in the first path group in the communication test, couple a third path other than the first path in the first path group with the first node device, couple a second path in the second path group with the second node device, and couple the third path and the second path with each other.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating exemplary resource management information;

FIG. 6 is a diagram illustrating exemplary resource allocation information;

FIGS. 8A and 8B are diagrams illustrating the resource management information and the resource allocation information when the single-link reconstruction is performed;

FIGS. 10A and 10B are diagrams illustrating the resource management information and the resource allocation information when the inter-link lane reconstruction is performed;

DESCRIPTION OF EMBODIMENT

Figure 1:
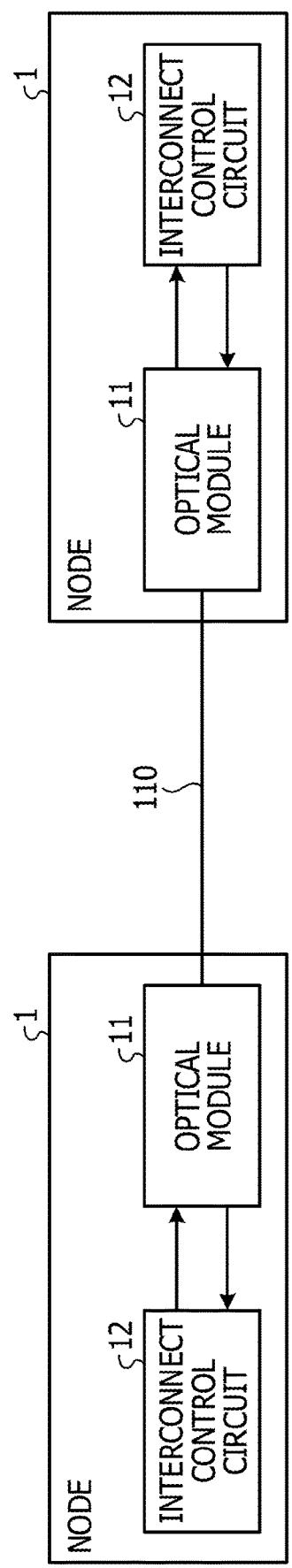
FIG. 1 is a schematic configuration diagram of a communication system including optical modules.

When deactivated, a link is cut off from operation of a system and waits for hardware replacement. However, a replacement component and a replacement worker are not often promptly found, and calculation resources of the system are restricted until the replacement is made. Some jobs assigned to the system limit the number of nodes to be used as well as a coupling shape of the nodes, and thus execution of such a job is encumbered by the link deactivation. As a result, it is difficult to continue communication operation when link deactivation occurs. Thus, the link deactivation is preferably avoided to maintain the availability of the system. To achieve this, it is important how to handle failure of an optical module, which is a large factor of the link deactivation.

Methods of avoiding the link deactivation or adverse influence thereof include a method of redundantly preparing physical lanes and a method of switching physical lanes used in a link. Another method performs switching to a bypass through any other node to continue communication between two nodes coupled through a failed link.

However, the scale of such a system has been increasing, and the number of interconnect links coupling nodes is becoming enormous. Accordingly, the method of preparing redundant lanes potentially suffers cost increase, and thus is difficult to execute. The method of performing switching in a single link is based on an assumption that the link includes a lane at which no failure is detected, and without such a lane, it is difficult to recover the link and thus continue communication operation.

The method of employing bypassing via any other node potentially leads to increase of communication latency. In this method, a bandwidth is shared with a plurality of other links. For example, when failure occurs at one of links passing through four nodes, a bandwidth is shared by the other three links, which potentially provides adverse influence on communication using the other three links. Thus, it is difficult to apply the method of using a bypass through any other node to the field of high performance computing (HPC) of a super computer or the like because the application has large possibility of causing significant performance degeneration.

In the conventional technology of performing reallocation of physical and logic lanes, path switching is performed between lanes in a single link. When failure occurs at all lanes in the link, the link is deactivated, and thus it is difficult to continue communication operation. The conventional technology of resolving the state of lane degeneracy by using an unused physical lane is based on an assumption that there is any unused physical lane available. Thus, it is difficult to continue communication operation when no unused lane is available. In the conventional technology of performing switching to a path bypassing a partial path at which failure has occurred, it is difficult to continue communication operation when link deactivation occurs at nodes coupled with each other through one link. In the conventional technology of sharing path resources based on priority information, when failure occurs at all lanes in a link, there is no resource to be shared and link deactivation inevitably occurs, and thus it is difficult to continue communication operation. In the conventional technology of performing a conduction test on a specified interval by using an optical signal, it is possible to specify a failed interval, but no measures are provided for the failed interval, and thus it is difficult to continue communication operation. In the conventional technology of forming a multi-stage connected network through a bypass switch, it is difficult to achieve the network in one link and thus continue communication operation.

An embodiment of an inter-node communication device, a parallel processing device, and an inter-node communication path controlling method that are disclosed in the present application will be described in detail below with reference to the accompanying drawings. The following embodiment does not limit the inter-node communication device, the parallel processing device, and the inter-node communication path controlling methods that are disclosed in the present application.

FIG. 1 is a schematic configuration diagram of a communication system including optical modules. As illustrated in FIG. 1, the communication system includes two nodes 1. Each node 1 includes an optical module 11 and an interconnect control circuit 12.

The optical modules 11 are coupled with each other through a fiber cable 110. Each optical module 11 receives, from the interconnect control circuit 12, inputting of an electric signal to be transmitted to the node 1 at a communication destination. Then, the optical module 11 converts the electric signal into an optical signal. Thereafter, the optical module 11 transmits the optical signal obtained by the conversion to the optical module 11 of the node 1 at the destination through the fiber cable 110.

The optical module 11 receives an optical signal from the optical module 11 of the node 1 at the source through the fiber cable 110. Then, the optical module 11 converts the received optical signal into an electric signal, and outputs the electric signal to the interconnect control circuit 12.

The interconnect control circuit 12 performs communication control such as timing adjustment and transmission path selection of signals received from the other node 1. FIG. 1 illustrates a case in which the nodes 1 are coupled with each other on a one-on-one basis, but in reality, each node 1 is coupled with a plurality of other nodes 1, and accordingly, the interconnect control circuit 12 controls communication with the plurality of nodes 1.

Figure 2:
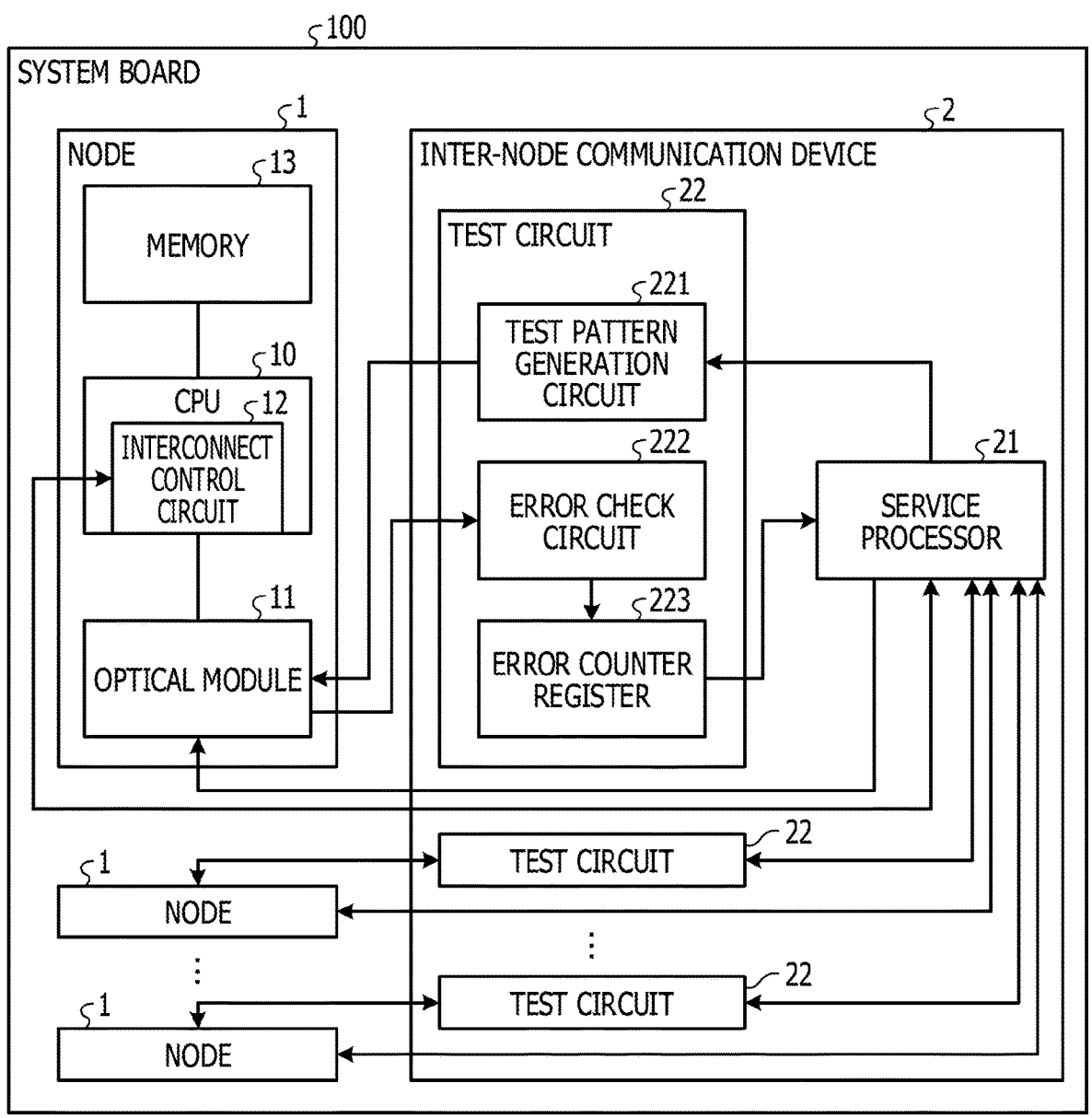
FIG. 2 is a hardware configuration diagram of a node and an inter-node communication device.

The following describes functionality of inter-node communication control with reference to FIG. 2. FIG. 2 is a hardware configuration diagram of a node and an inter-node communication device. The following description will be made with an example in which a plurality of nodes 1 and an inter-node communication device 2 are mounted on one system board 100. However, the nodes 1 may be disposed on different system boards 100 for performing communication with each other. The system board 100, an information processing device on which the system board 100 is mounted, and the nodes 1 coupled with each other through the fiber cable 110 illustrated in FIG. 1 correspond to an exemplary "parallel processing device".

Each node 1 includes a CPU 10, the optical module 11, and a memory 13. The CPU 10 includes the interconnect control circuit 12. The optical modules 11 of the respective nodes 1 are coupled with each other through the fiber cable 110 as illustrated in FIG. 1. In FIG. 2, the fiber cable 110 is omitted for simplicity of illustration.

The CPU 10 performs arithmetic processing by using the memory 13. The CPU 10 performs communication with the CPU 10 of another node 1 by using the optical module 11. The CPU 10 corresponds to an exemplary "first arithmetic processing device" and an exemplary "second arithmetic processing device".

The interconnect control circuit 12 controls communication between the CPU 10 on which the interconnect control circuit 12 is mounted and the CPU 10 mounted on another node 1. When no anomaly has occurred at a lane coupled with the other node 1, the interconnect control circuit 12 allocates the lane to a link coupling the nodes 1 in a predetermined initial state, and performs communication.

When anomaly has occurred in communication with the other node 1, the interconnect control circuit 12 specifies a failed lane at which the anomaly has occurred and notifies a service processor 21 of the specified lane. Thereafter, the interconnect control circuit 12 receives a stop instruction and a re-initialization instruction from the service processor 21. The re-initialization instruction includes information on lane allocation to each link newly set so that a failed place is bypassed. Then, the interconnect control circuit 12 initializes each port included in the interconnect control circuit 12 and then performs setting of the port based on the received allocation information. Thereafter, the interconnect control circuit 12 performs communication with the other node 1 through each port thus newly set.

When anomaly has occurred in communication with the other node 1, the optical module 11 receives a test-path switching instruction and a signal returning instruction from the service processor 21. Then, the optical module 11 sets test paths in accordance with the instructions.

Thereafter, the optical module 11 receives inputting of a test signal from a test pattern generation circuit 221 included in a test circuit 22 mounted on the inter-node communication device 2. Then, the optical module 11 transmits the received test signal through the set test paths, and outputs the signal having passed through each path to an error check circuit 222 included in the test circuit 22 mounted on the inter-node communication device 2.

Thereafter, the optical module 11 receives, from the service processor 21, inputting of path setting for bypassing a failed place. Then, the optical module 11 performs path setting by switching paths in accordance with specification from the service processor 21.

The inter-node communication device 2 detects any failure occurred in communication between the nodes 1, and continues communication by bypassing a failed place. The inter-node communication device 2 includes the service processor 21 and the test circuit 22.

The service processor 21 is coupled with the optical module 11 and the interconnect control circuit 12 through a bus that is compliant with Inter-Integrated Circuit (I2C; registered trademark). The service processor 21 receives notification of a failed lane from the interconnect control circuit 12. Subsequently, the service processor 21 notifies the interconnect control circuit 12 of the test-path switching instruction and the signal returning instruction.

Then, the service processor 21 transmits a test execution instruction to the test pattern generation circuit 221 of the test circuit 22. Thereafter, the service processor 21 acquires the count of errors of each lane stored in an error counter register 223 of the test circuit 22, and specifies a failed place on a failed lane.

Thereafter, the service processor 21 determines a path bypassing the specified failed place so that communication continues between the nodes 1. Then, the service processor 21 instructs the optical module 11 to perform switching to the determined path. In addition, the service processor 21 transmits, to the interconnect control circuit 12, an instruction to stop a link on which resetting is to be performed and an instruction to reinitialize the link. With this re-initialization instruction, the service processor 21 instructs the interconnect control circuit 12 to perform lane allocation to each link newly set to bypass the failed place.

The test circuit 22 is achieved by, for example, an incorporated circuit including combined logic circuits. The test circuit 22 includes the test pattern generation circuit 221, the error check circuit 222, and the error counter register 223.

The test pattern generation circuit 221 receives the test execution instruction from the service processor 21. Then, the test pattern generation circuit 221 generates a test signal including a predetermined test pattern. Thereafter, the test pattern generation circuit 221 inputs the generated test signal to the optical module 11.

The error counter register 223 includes a counter corresponding to each test place on a lane as a test target.

The error check circuit 222 acquires the test signal output through each set test path included in the optical module 11.

Then, the error check circuit 222 determines whether any error has occurred by comparing the predetermined test pattern and the pattern of the acquired test signal. When an error has occurred, the error check circuit 222 increments, by one, a counter included in the error counter register 223 corresponding to a failed place through which the test signal has passed.

Figure 3:
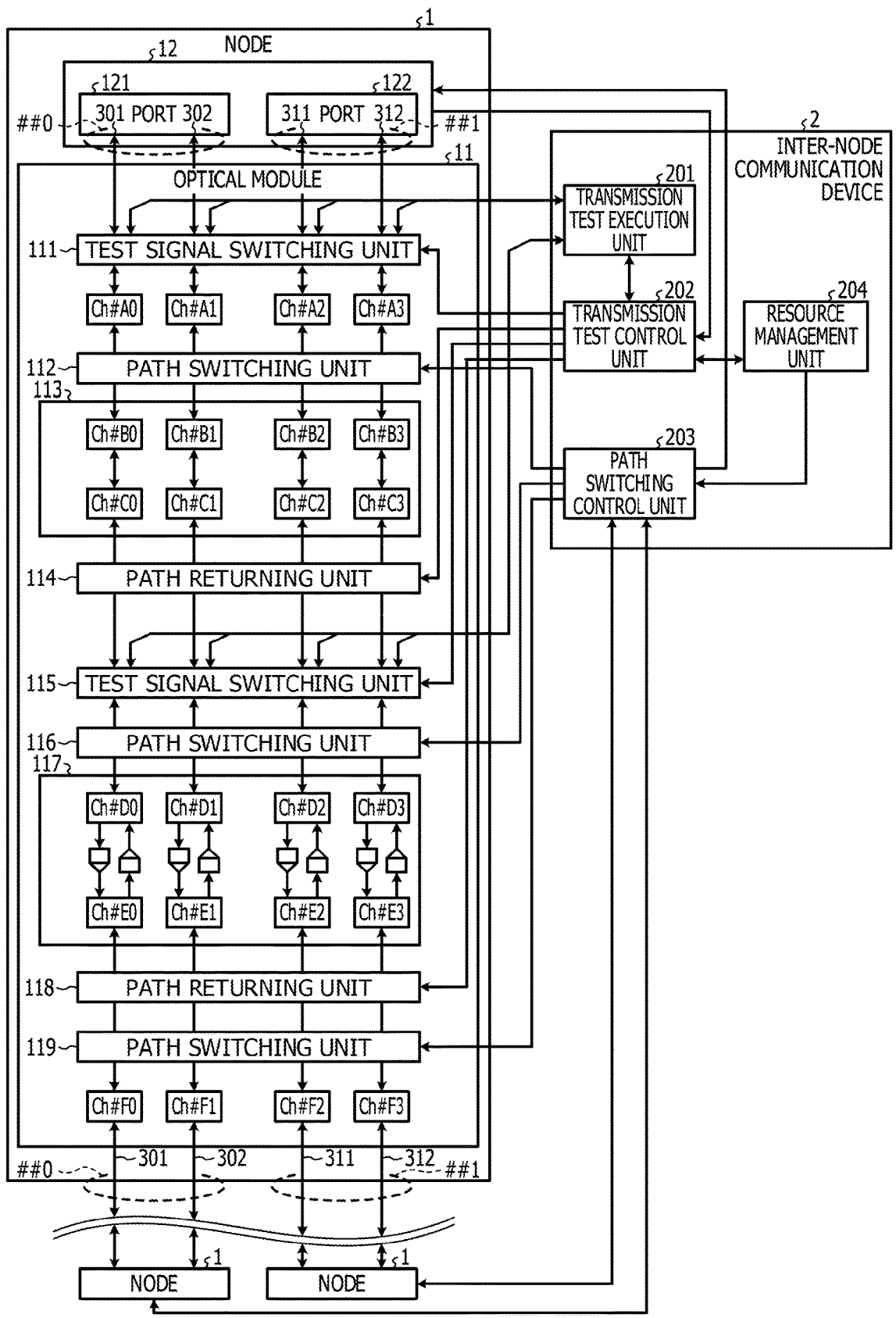
FIG. 3 is a block diagram of the inter-node communication device.

The following describes communication path switching processing performed by the inter-node communication device 2 and operation of the optical module in detail with reference to FIG. 3. FIG. 3 is a block diagram of the inter-node communication device.

The following description will be made on the communication path switching processing under conditions described below. The interconnect control circuit 12 includes two ports 121 and 122. The port 121 is coupled with another node 1 through a link ##0. The port 122 is coupled with the other node 1 through a link ##1.

The link ##0 includes lanes 301 and 302. The link ##1 includes lanes 311 and 312. In the present embodiment, the lanes 301, 302, 311, and 312 are defined by coupling points at the port 121 and coupling points of the node 1 with the outside. In FIG. 3, the coupling points at the port 121 and the coupling points of the node 1 with the outside are denoted by reference signs to express the lanes 301, 302, 311, and 312. For example, the lane 301 remains the same when paths are changed in the optical module 11 while the coupling point at the port 121 and the coupling point of the node 1 with the outside that correspond to the lane 301 remain the same.

The optical module 11 includes a test signal switching unit 111, a path switching unit 112, an electric signal processing unit 113, a path returning unit 114, a test signal switching unit 115, a path switching unit 116, an electro-optical conversion unit 117, a path returning unit 118, and a path switching unit 119.

Through four communication paths, the test signal switching unit 111 is coupled with the coupling points of the lanes 301 and 302 at the port 121 and the coupling points of the lanes 311 and 312 at the port 122. The test signal switching unit 111 is also coupled with the path switching unit 112 through four communication paths of channels #A0 to #A3. In FIG. 3, the channels #A0 to #A3 are expressed as "Ch #A0 to #A3".

The path switching unit 112 is coupled with the electric signal processing unit 113 through four communication paths of channels #B0 to #B3. In FIG. 3, the channels #B0 to #B3 are expressed as "Ch #B0 to #133". The electric signal processing unit 113 is coupled with the path returning unit 114 through four communication paths of channels #C0 to #C3. In FIG. 3, the channels #C0 to #C3 are expressed as "Ch #C0 to #C3".

The path returning unit 114 is coupled with the test signal switching unit 115 through four communication paths. The test signal switching unit 115 is coupled with the path switching unit 116 through four communication paths.

The path switching unit 116 is coupled with the electro-optical conversion unit 117 through four communication paths of channels #D0 to #D3. In FIG. 3, the channels #D0 to #D3 are expressed as "Ch #D0 to #D3". The electro-optical conversion unit 117 is coupled with the path returning unit 118 through four communication paths of channels #E0 to #E3. In FIG. 3, the channels #E0 to #E3 are expressed as "Ch #E0 to #E3".

The path returning unit 118 is coupled with the path switching unit 119 through four communication paths. The path switching unit 119 is coupled with the external coupling points of the lanes 301, 302, 311, and 312 through four communication paths of channels #F0 to #F3.

The test signal switching unit 111 is coupled with four test-signal communication paths extending from a transmission test execution unit 201 of the inter-node communication device 2. The test signal switching unit 111 is capable of selectively switching coupling of each of the channels #A0 to #A3 with any of the communication paths extending from the ports 121 and 122 and the test-signal communication paths extending from the transmission test execution unit 201.

The path switching unit 112 is capable of switching coupling of the channels #A0 to #A3 with the channels #B0 to #B3.

The path returning unit 114 is capable of selectively switching coupling of the channels #C0 to #C3 with the four communication paths coupled with the test signal switching unit 115 or returning of the channels. Paths coupling the channels #C0 to #C3 with the four communication paths coupled with the test signal switching unit 115 are fixed. In FIG. 3, the path returning unit 114 couples each of the channels #C0 to #C3 with a communication path positioned on the same line in the longitudinal direction.

The test signal switching unit 115 is coupled with the four test-signal communication paths extending from the transmission test execution unit 201 of the inter-node communication device 2. The test signal switching unit 115 is capable of selectively switching coupling of each of the four communication paths coupled with the path switching unit 116 with any of the communication paths extending from the path returning unit 114 and the test-signal communication paths extending from the transmission test execution unit 201.

The path switching unit 116 is capable of switching coupling of the four communication paths extending from the test signal switching unit 115 with the channels #D0 to #D3.

The path returning unit 118 is capable of selectively switching coupling of the channels #E0 to #E3 with the four communication paths coupled with the path switching unit 119 or returning of the channels. Paths coupling the channels #E0 to #E3 with the four communication paths coupled with the path switching unit 119 are fixed. In FIG. 3, the path returning unit 118 couples each of the channels #E0 to #E3 with a communication path positioned on the same line in the longitudinal direction.

The path switching unit 119 is capable of switching coupling of the four communication paths extending from the path returning unit 118 with the channels #F0 to #F3.

The electric signal processing unit 113 performs analog-digital (AD) conversion, digital-analog (DA) conversion, and serial-parallel conversion. Hereinafter, paths coupling the channels #B0 to #B3 with the respective channels #C0 to #C3 at the electric signal processing unit 113 are denoted by #B0-#C0 to #B3-#C3 in some cases. The paths #B0-#C0 to #B3-#C3 each correspond to an exemplary "first signal transmit path".

The electro-optical conversion unit 117 converts, from an electric signal to an optical signal, a signal to be sent from the interconnect control circuit 12 to another node 1. The electro-optical conversion unit 117 converts, from an optical signal to an electric signal, a signal received from another node 1. In FIG. 3, components disposed on paths coupling the channels #D0 to #D3 with the respective channels #E0 to #E3 are electro-optical conversion modules. Hereinafter, the paths coupling the channels #D0 to #D3 with the respective channels #E0 to #E3 in the electro-optical conversion unit 117 are denoted by #D0-#E0 to #D3-#E3 in some cases. The paths #D0-#E0 to #D3-#E3 each correspond to an exemplary "second signal transmit path".

When allocated to the lanes 301, 302, 311, and 312, the communication paths #B0-#C0 to #B3-#C3 of the electric signal processing unit 113 and the communication paths #D0-#E0 to #D3-#E3 of the electro-optical conversion unit 117 are used as communication paths between the nodes 1. Hereinafter, the communication paths #B0-#C0 to #B3-#C3 in the electric signal processing unit 113 and the electro-optical conversion unit 117, which are allocated to the lanes 301, 302, 311, and 312, are referred to as "resources" in some cases.

The following describes a case in which failure occurs at one or both sets of the paths #D0-#E0 to #D3-#E3 or the paths coupled with the electro-optical conversion unit 117 in the optical module 11. In the configuration illustrated in FIG. 3, the link ##0 is not able to be used when communication is disconnected at both lanes 301 and 302. Thus, when anomaly has occurred at both lanes 301 and 302, it is desirable to maintain communication through any of the lanes 301 and 302 to avoid deactivation of the link ##0. This is same for the link ##1.

The following describes the inter-node communication device 2. The inter-node communication device 2 includes the transmission test execution unit 201, a transmission test control unit 202, a path switching control unit 203, and a resource management unit 204.

The transmission test control unit 202 is achieved by the service processor 21 exemplarily illustrated in FIG. 2 when executing firmware incorporated in the service processor 21. The transmission test control unit 202 receives notification of a failed lane from the interconnect control circuit 12. The following describes a case in which the lane 312 is a failed lane. The transmission test control unit 202 acquires, from the resource management unit 204, test target resource information on the resources of the electric signal processing unit 113 and the electro-optical conversion unit 117 allocated to the lane 312 as the failed lane. In this example, the transmission test control unit 202 acquires the test target resource information of the paths #B3-#C3 and #D3-#E3.

Figure 4:
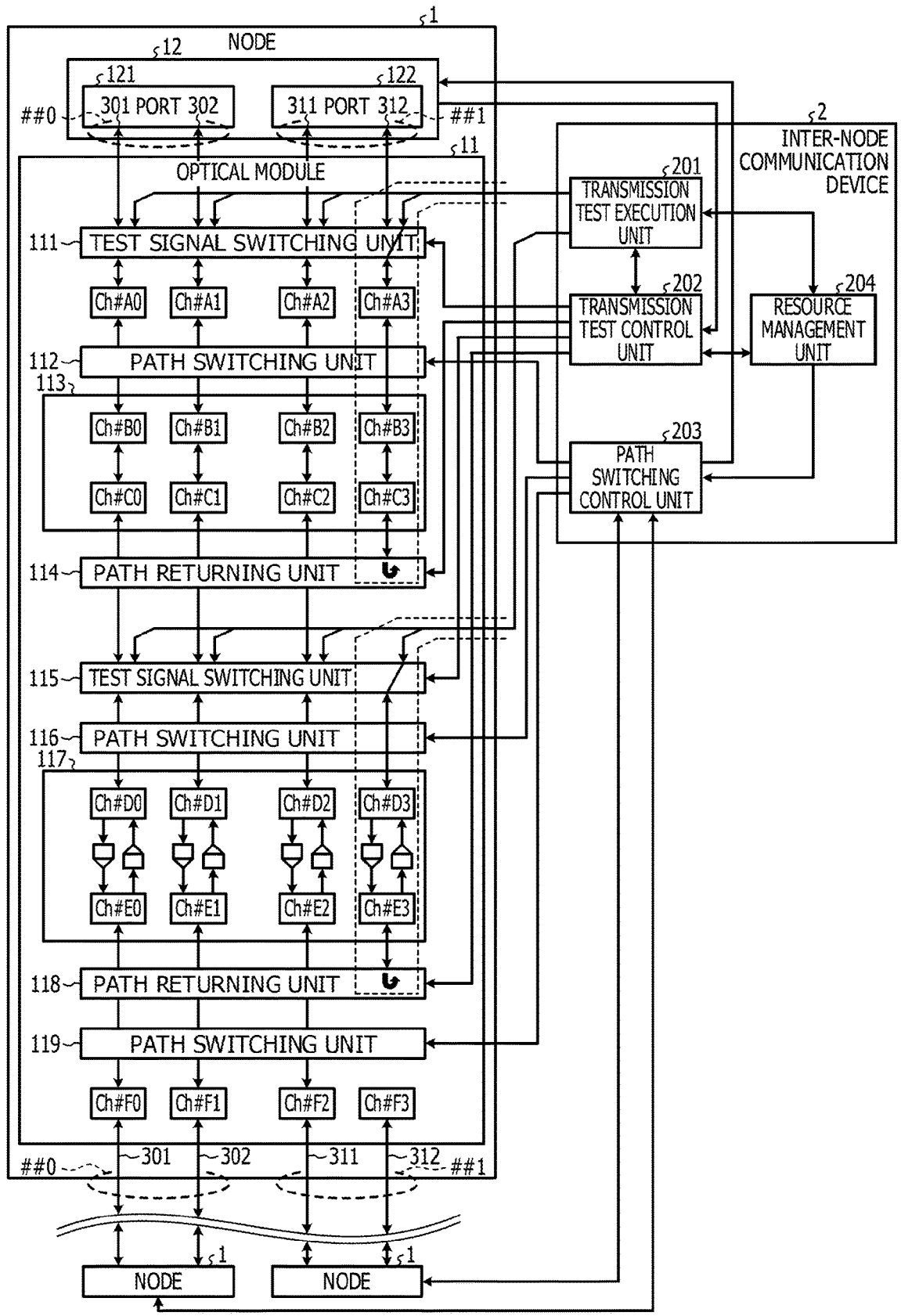
FIG. 4 is a diagram illustrating a state at execution of a transmission test.

Subsequently, as illustrated in FIG. 4, the transmission test control unit 202 sets the path returning unit 114 so that a signal output from the channel #C3 of the electric signal processing unit 113 is returned and input to the channel #C3. FIG. 4 is a diagram illustrating a state at execution of a transmission test. As illustrated in FIG. 4, the transmission test control unit 202 sets the path returning unit 118 so that a signal output from the channel #E3 of the electro-optical conversion unit 117 is returned and input to the channel #E3.

In addition, as illustrated in FIG. 4, the transmission test control unit 202 switches the paths of the test signal switching unit 111 so that the channel #A3 coupled with the path #B3-#C3 is coupled with a test-signal communication path extending from the transmission test execution unit 201. As illustrated in FIG. 4, the transmission test control unit 202 switches the paths of the test signal switching unit 115 so that the communication path coupled with the path #D3-#E3 is coupled with a test-signal communication path extending from the transmission test execution unit 201.

Accordingly, a test signal output from the transmission test execution unit 201 passes through the channel #A3 and the path #B3-#C3 allocated to the lane 312 as the failed lane, and then is returned to the transmission test execution unit 201 through the path #B3-#C3 and the channel #A3. A test signal output from the transmission test execution unit 201 passes through the path #D3-#E3 allocated to the lane 312 as the failed lane, and then is returned to the transmission test execution unit 201 through the path #D3-#E3.

Then, the transmission test control unit 202 instructs the transmission test execution unit 201 to perform a test on the path #B3-#C3 and the path #D3-#E3 as test target resources. Thereafter, the transmission test control unit 202 receives, from the transmission test execution unit 201, notification of whether a failed place is located at the path #B3-#C3 or the path #D3-#E3, or both.

Then, the transmission test control unit 202 notifies the resource management unit 204 of the failed place. Thereafter, the transmission test control unit 202 sets the test signal switching units 111 and 115 back to paths coupling the nodes 1, and also sets the path returning units 114 and 118 back to paths that allow signals to pass therethrough.

The transmission test execution unit 201 is achieved by the service processor 21 and the test circuit 22 exemplarily illustrated in FIG. 2. The transmission test execution unit 201 receives, from the transmission test control unit 202, an instruction to perform a test on the path #B3-#C3 and the path #D3-#E3 as the test target resources. Then, the transmission test execution unit 201 generates a test signal including a predetermined test pattern.

Subsequently, the transmission test execution unit 201 sends the generated test signal to each of the path #B3-#C3 and the path #D3-#E3 allocated to the lane 312 as the failed lane, and acquires a signal returning from each of the path #B3-#C3 and the path #D3-#E3. Then, when the pattern of data included in the returned signal is different from the test pattern, the transmission test execution unit 201 determines that an error has occurred. Then, the transmission test execution unit 201 increments, by one, an error counter corresponding to one or both of the path #B3-#C3 and the path #D3-#E3 at which the error is determined to have occurred. The transmission test execution unit 201 repeats the above-described test a plurality of times.

Thereafter, the transmission test execution unit 201 calculates the bit error rate (BER) of each of the path #B3-#C3 and the path #D3-#E3 as the test target resources based on the number of transmitted test signals and the value of the corresponding error counter. Thereafter, the transmission test execution unit 201 determines whether the calculated bit error rate of each of the path #B3-#C3 and the path #D3-#E3 as the test target resources exceeds a predetermined threshold. Accordingly, the transmission test execution unit 201 determines whether failure has occurred at each of the path #B3-#C3 and the path #D3-#E3, and specifies, as a failed place, one or both of the path #B3-#C3 and the path #D3-#E3. Then, the transmission test execution unit 201 transmits information on the failed place to the transmission test control unit 202. The transmission test execution unit 201 and the transmission test control unit 202 each correspond to an exemplary "test unit".

The resource management unit 204 is achieved by the service processor 21 exemplarily illustrated in FIG. 2 when executing firmware incorporated in the service processor 21. The resource management unit 204 stores resource management information 410 illustrated in FIG. 5 and resource allocation information 420 illustrated in FIG. 6. FIG. 5 is a diagram illustrating exemplary resource management information. FIG. 6 is a diagram illustrating exemplary resource allocation information.

As illustrated in FIG. 5, the resource management information 410 includes an electric signal processing unit table 411 and an electro-optical conversion unit table 412. The electric signal processing unit table 411 registers communication paths in the electric signal processing unit 113 used for the links ##0 and ##1 and the states thereof. The electric signal processing unit table 411 indicates the number of available communication paths in the electric signal processing unit 113 that are included in each of the links ##0 and ##1.

The electro-optical conversion unit table 412 registers communication paths in the electro-optical conversion unit 117 used in the links ##0 and ##1 and the states thereof. The electro-optical conversion unit table 412 indicates the number of available communication paths in the electro-optical conversion unit 117 that are allocated to the links ##0 and ##1.

As illustrated in FIG. 6, the resource allocation information 420 registers, for each of the links ##0 and ##1, the lane name of any of the lanes 301, 302, 311, and 312 included in the link, the state of degeneracy, and allocated resources.

In an initial state, for example, at activation of the nodes 1 when no failure occurs, the resource management unit 204 determines path setting to couple communication paths positioned on the same line in the longitudinal direction in FIG. 3. Then, the resource management unit 204 registers, in accordance with the determined path setting, a resource name, a failure state, an allocation state, the number of available resources for each of the links ##0 and ##1 in each of the electric signal processing unit table 411 and the electro-optical conversion unit table 412. For example, in the initial state, the resource management unit 204 allocates, as resources of the lanes 301 and 302 of the link ##0, the paths #B0-#C0 and #B1-#C1 among the resources of the electric signal processing unit 113. Specifically, the resource management unit 204 registers #B0-#C0 and #B1-#C1 as resource names to the table of the link ##0 in the electric signal processing unit table 411, and registers "No" to the failure state and "Done" to the allocation state for each resource. In addition, the resource management unit 204 registers "2" to the number of available resources because both of #B0-#C0 and #B1-#C1 are available. Then, the resource management unit 204 notifies the path switching control unit 203 of the determined path setting.

After failure has occurred at a lane, the resource management unit 204 receives notification of a failed place from the transmission test execution unit 201. Then, the resource management unit 204 changes the failure state of the failed place to "Yes" in the resource management information 410. In addition, the resource management unit 204 decreases, by one, the number of available resources in a table including the failed place. For example, when the failed lane is the lane 312 and failure has occurred at the path #B3-#C3, the resource management unit 204 changes the failure state of the path #B3-#C3 to "Yes" in the table of the link ##1 including the lane 312 in the electric signal processing unit table 411. In addition, the resource management unit 204 changes the number of available resources to "1" in the table of the link ##1 including the lane 312 in the electric signal processing unit table 411.

Subsequently, the resource management unit 204 performs resource reallocation to the link ##0 or ##1 including the failed lane. Hereinafter, the link ##0 or ##1 including a failed lane is referred to as a "failed link". Specifically, the resource management unit 204 performs resource reallocation to the failed lane to continue communication between the nodes 1 by bypassing the failed place.

The present embodiment describes a case in which the resource reallocation processing is performed by the resource management unit 204 at each occurrence of failure to obtain a largest possible number of communication paths. However, when communication is possible through the links ##0 and ##1 including a failed lane, the resource management unit 204 does not have to perform the resource reallocation processing. The following describes an example in which failure occurs at a resource of the electric signal processing unit 113 on the lane 301 and a resource of the electro-optical conversion unit 117 on the lane 302 when the link ##0 includes an additional lane 303. In this case, communication is possible through the link ##0, but the lanes 301 and 302 are unavailable. However, only one of the lanes 301 and 302 is unavailable when reallocation processing describes below is executed.

The following describes, in detail, reconstruction of the lanes 301, 302, 311, and 312 through the resource reallocation by the resource management unit 204. The resource management unit 204 checks whether the number of available resources at a failed link in the electric signal processing unit table 411 and the electro-optical conversion unit table 412 is zero. When the number of available resources is not zero, the resource management unit 204 executes the resource reallocation in the failed link.

Figure 7:
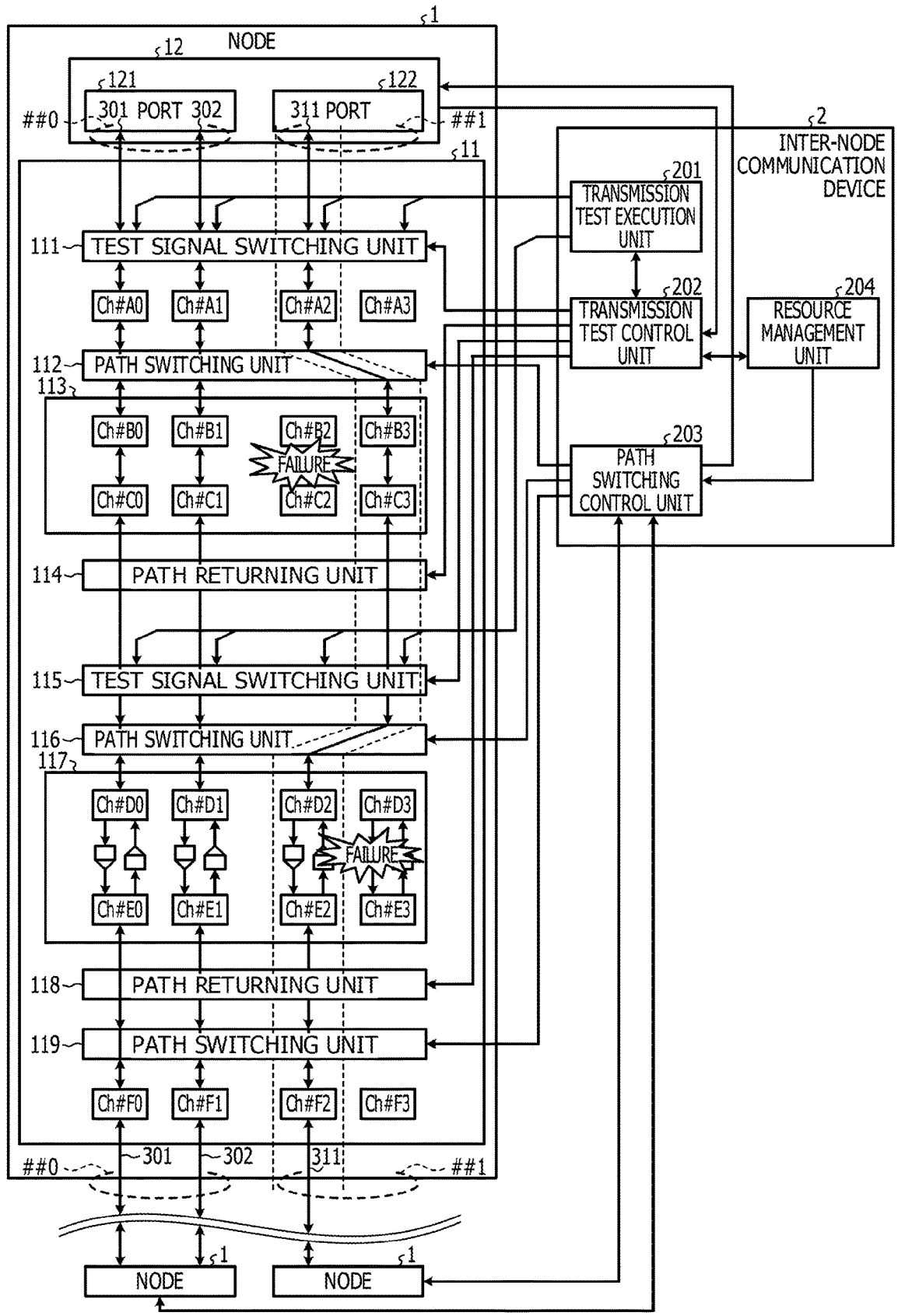
FIG. 7 is a diagram illustrating single-link lane reconstruction.

Execution of the resource reallocation in the failed link will be described with an example in which failure occurs at the path #B2-#C2 allocated to the lane 311 and the path #D3-#E3 allocated to the lane 312 in the link ##1. FIG. 7 is a diagram illustrating single-link lane reconstruction. FIGS. 8A and 8B are diagrams illustrating the resource management information and the resource allocation information when the single-link reconstruction is performed.

The resource management unit 204 initializes the electric signal processing unit table 411 and the electro-optical conversion unit table 412 of the resource management information 410, and the link ##1 in the resource allocation information 420. Specifically, the resource management unit 204 sets "Yet to be done" to the allocation states of all resources of the link ##1 in the electric signal processing unit table 411 and the electro-optical conversion unit table 412 of the resource management information 410. The resource management unit 204 sets "Yes" to the degeneracies of both lanes 311 and 312 of the link ##1 in the resource allocation information 420, and clears all allocated resources of the lanes.

Subsequently, the resource management unit 204 selects, from among the lanes 311 and 312, the lane 311 as an allocation target lane to which resources are to be allocated. Then, the resource management unit 204 determines whether any resource suffering no failure and yet to be allocated is available in the link ##1 in the electric signal processing unit table 411 of the resource management information 410. In this example, the path #B3-#C3 is available as a resource suffering no failure and yet to be allocated, and thus the resource management unit 204 determines to allocate the path #B3-#C3 to the lane 311 as the allocation target lane. Then, as illustrated in FIG. 8, the resource management unit 204 registers the path #B3-#C3 as an allocated resource of the electric signal processing unit 113 for the lane 311 in the link ##1 of the resource allocation information 420. In addition, the resource management unit 204 changes, to "Done", the allocation state of the path #B3-#C3 in the link ##1 in the electric signal processing unit table 411 of the resource management information 410.

Subsequently, the resource management unit 204 determines whether any resource suffering no failure and yet to be allocated is available in the link ##1 in the electro-optical conversion unit table 412 of the resource management information 410. In this example, the path #D2-#E2 is available as a resource suffering no failure and yet to be allocated, and thus the resource management unit 204 determines to allocate the path #D3-#E3 to the lane 311 as the allocation target lane. Then, as illustrated in FIG. 8, the resource management unit 204 registers the path #D2-#E2 as an allocated resource of the electro-optical conversion unit 117 in the lane 311 in the link ##1 of the resource allocation information 420. In addition, the resource management unit 204 sets "No" to the degeneracy of the lane 311 in the link ##1 of the resource allocation information 420. The resource management unit 204 also changes, to "Done", the allocation state of the path #D2-#E2 in the link ##1 in the electro-optical conversion unit table 412 of the resource management information 410.

Subsequently, the resource management unit 204 selects, from among the lanes 311 and 312, the lane 312 as an allocation target lane to which resources are to be allocated. Then, the resource management unit 204 determines whether any resource suffering no failure and yet to be allocated is available in the link ##1 in the electric signal processing unit table 411 of the resource management information 410. In this example, the path #B2-#C2 suffers failure and the path #B3-#C3 is already allocated. Thus, the resource management unit 204 ends the resource reallocation processing in the failed link. Accordingly, the path of the lane 311 in the optical module 11 is determined to be a path sandwiched between dotted lines illustrated in FIG. 7. The lane 312 is degenerated. In this case, the resource management information 410 and the resource allocation information 420 are in states as illustrated in FIG. 8.

However, when the number of available resources is zero in the failed link in the electric signal processing unit table 411 and the electro-optical conversion unit table 412, the resource management unit 204 executes inter-link resource reallocation.

Figure 9:
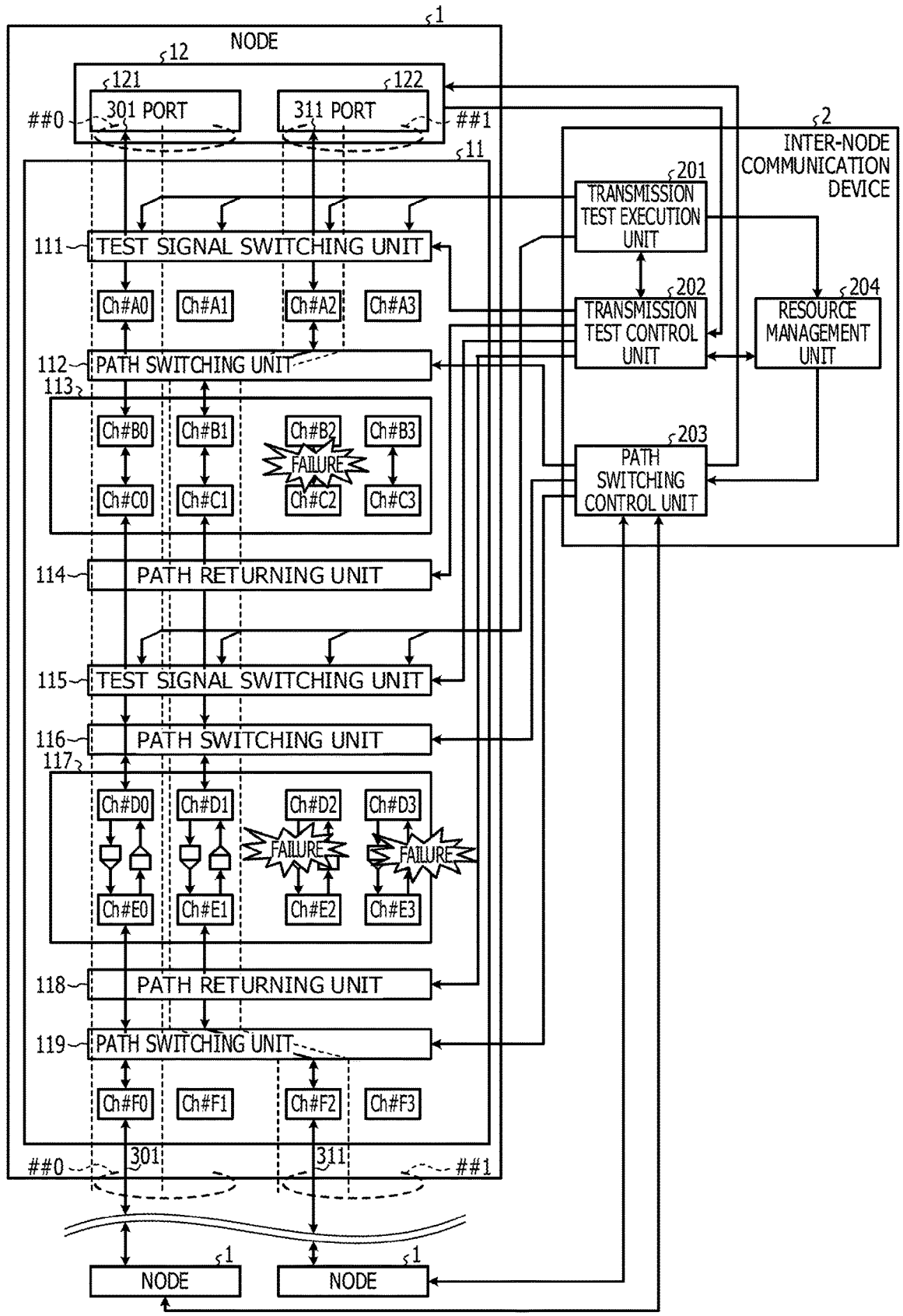
FIG. 9 is a diagram illustrating inter-link lane reconstruction.

Execution of the inter-link resource reallocation will be described with an example in which failure occurs at the paths #B2-#C2 and #D2-#E2 allocated to the lane 311 and the path #D3-#E3 allocated to the lane 312 in the link ##1. FIG. 9 is a diagram illustrating inter-link lane reconstruction. FIGS. 10A and 10 B are diagrams illustrating the resource management information and the resource allocation information when the inter-link lane reconstruction is performed.

The resource management unit 204 specifies a shared link with which the link ##1 shares resources. In this example, there are the two links ##0 and ##1, and thus the resource management unit 204 specifies the link ##0 as the shared link.

However, for example, when there are links ##1 to ##n, the resource management unit 204 specifies the shared link through a procedure described below. The resource management unit 204 acquires, from the resource management information 410, the number of available resources of the electric signal processing unit 113 and the number of available resources of the electro-optical conversion unit 117 for each of the links ##0 and ##2 to ##n other than the failed link. Then, the resource management unit 204 determines the smaller one of both acquired numbers of available resources to be the number of lanes available for each of the links ##0 and ##2 to ##n. Subsequently, the resource management unit 204 determines whether the number of available lanes is equal to or larger than two for any of the links ##0 and ##2 to ##n. When the number of available lanes is equal to or larger than two for any of the links, the resource management unit 204 specifies the shared link to be a link, the number of available lanes of which is largest among the links ##0 and ##2 to ##n.

The resource management unit 204 initializes information on the link ##1 as the failed link and information on the link ##0 as the shared link in the electric signal processing unit table 411 and the electro-optical conversion unit table 412 of the resource management information 410 and the resource allocation information 420. Specifically, the resource management unit 204 sets "Yet to be done" to the allocation states of all resources of the links ##0 and ##1 in the electric signal processing unit table 411 and the electro-optical conversion unit table 412 of the resource management information 410. In addition, the resource management unit 204 sets "Yes" to the degeneracies of both lanes 311 and 312 of the links ##0 and ##1 in the resource allocation information 420, and clears all allocated resources thereof.

Subsequently, the resource management unit 204 selects, as an allocation target link, any one of the link ##1 as the failed link and the link ##0 as the shared link. For example, the resource management unit 204 selects the link ##0 as the allocation target link.

Subsequently, the resource management unit 204 selects, from among the lanes 301 and 302 included in the link ##0 selected as the allocation target link, one allocation target lane to which resources are to be allocated. For example, the resource management unit 204 selects the lane 301. Then, the resource management unit 204 determines whether any resource suffering no failure and yet to be allocated is available in the link ##0 or ##1 in the electric signal processing unit table 411 of the resource management information 410. In this example, the path #B0-#C0 is available as a resource suffering no failure and yet to be allocated, and thus the resource management unit 204 determines to allocate the path #B0-#C0 to the lane 301 as the allocation target lane. Then, as illustrated in FIG. 10, the resource management unit 204 registers the path #B0-#C0 as an allocated resource of the electric signal processing unit 113 in the lane 301 in the link ##0 of the resource allocation information 420. In addition, the resource management unit 204 changes, to "Done", the allocation state of the path #B0-#C0 in the link ##0 in the electric signal processing unit table 411 of the resource management information 410.

Subsequently, the resource management unit 204 determines whether any resource suffering no failure and yet to be allocated is available in the link ##0 or ##1 in the electro-optical conversion unit table 412 of the resource management information 410 is available. In this example, the path #D0-#E0 is available as a resource suffering no failure and yet to be allocated, and thus the resource management unit 204 determines to allocate the path #D0-#E0 to the lane 301 as the allocation target lane. Then, as illustrated in FIG. 10, the resource management unit 204 registers the path #D0-#E0 as an allocated resource of the electro-optical conversion unit 117 in the lane 301 in the link ##0 of the resource allocation information 420. In addition, the resource management unit 204 sets "No" to the degeneracy of the lane 301 in the link ##0 of the resource allocation information 420. The resource management unit 204 also changes, to "Done", the allocation state of the path #D0-#E0 in the link ##0 in the electro-optical conversion unit table 412 of the resource management information 410.

Subsequently, the resource management unit 204 selects the link ##1 as the allocation target link instead of the link ##0 previously selected as the allocation target link among the failed link and the shared link. Then, the resource management unit 204 selects, from among the lanes 311 and 312 included in the link ##1 selected as the allocation target link, one allocation target lane to which resources are to be allocated. For example, the resource management unit 204 selects the lane 311. Then, the resource management unit 204 determines whether any resource suffering no failure and yet to be allocated is available in the link ##0 or ##1 in the electric signal processing unit table 411 of the resource management information 410. In this example, the path #B1-#C1 is available as a resource suffering no failure and yet to be allocated, and thus the resource management unit 204 determines to allocate the path #B1-#C1 to the lane 311 as the allocation target lane. Then, as illustrated in FIG. 10, the resource management unit 204 registers the path #B1-#C1 as an allocated resource of the electric signal processing unit 113 in the lane 311 in the link ##1 of the resource allocation information 420. In addition, the resource management unit 204 changes, to "Done", the allocation state of the path #B1-#C1 in the link ##0 in the electric signal processing unit table 411 of the resource management information 410.

In the present embodiment, the resource management unit 204 selects resources for both lanes 301 and 302 from among the resources of the link ##0 in the electric signal processing unit table 411, but may select resources for one of the lanes from among the resources of the link ##1.

Subsequently, the resource management unit 204 determines whether any resource suffering no failure and yet to be allocated is available in the link ##0 or ##1 in the electro-optical conversion unit table 412 of the resource management information 410 is available. In this example, the path #D1-#E1 is available as a resource suffering no failure and yet to be allocated, and thus the resource management unit 204 determines to allocate the path #D1-#E1 to the lane 311 as the allocation target lane. Then, as illustrated in FIG. 10, the resource management unit 204 registers the path #D1-#E1 as an allocated resource of the electro-optical conversion unit 117 in the lane 311 in the link ##1 of the resource allocation information 420. In addition, the resource management unit 204 sets "No" to the degeneracy of the lane 311 in the link ##1 of the resource allocation information 420. The resource management unit 204 also changes, to "Done", the allocation state of the path #D1-#E1 in the link ##0 in the electro-optical conversion unit table 412 of the resource management information 410.

Subsequently, the resource management unit 204 selects the link ##0 as the allocation target link instead of the link ##1 previously selected as the allocation target link among the failed link and the shared link. Then, the resource management unit 204 selects, as the allocation target lane, the other lane 312 included in the link ##0 selected as the allocation target link. Then, the resource management unit 204 determines whether any resource suffering no failure and yet to be allocated is available in the link ##0 or ##1 in the electric signal processing unit table 411 of the resource management information 410. In this example, the path #B3-#C3 is available as a resource suffering no failure and yet to be allocated, and thus the resource management unit 204 determines to allocate the path #B3-#C3 to the lane 311 as the allocation target lane. Then, as illustrated in FIG. 10, the resource management unit 204 registers the path #B3-#C3 as an allocated resource of the electric signal processing unit 113 in the lane 311 in the link ##1 of the resource allocation information 420. In addition, the resource management unit 204 changes, to "Done", the allocation state of the path #B3-#C3 in the link ##0 in the electric signal processing unit table 411 of the resource management information 410.

Subsequently, the resource management unit 204 determines whether any resource suffering no failure and yet to be allocated is available in the link ##0 or ##1 in the electro-optical conversion unit table 412 of the resource management information 410 is available. In this example, the paths #D0-#E0 and #D1-#D1 are already allocated, and the paths #D2-#E2 and #D3-#D3 suffer failure. Thus, the resource management unit 204 ends the inter-link resource reallocation processing. Accordingly, the paths of the lanes 301 and 311 in the optical module 11 are determined to be paths each sandwiched between dotted lines illustrated in FIG. 9. The lanes 302 and 312 are degenerated. In this case, the resource management information 410 and the resource allocation information 420 are in states as illustrated in FIG. 10.

In the present embodiment, the resource management unit 204 performs the inter-link resource reallocation when the number of available resources of the electric signal processing unit 113 or the electro-optical conversion unit 117 allocated to the link ##1 or ##0 is zero. However, the resource management unit 204 may perform the inter-link resource reallocation when the number of available resources is not zero. For example, the resource management unit 204 may perform the inter-link resource reallocation whenever performing lane reallocation. In this manner, the resource management unit 204 maintains communication bandwidth balance by performing the inter-link resource reallocation when the number of available resources is not zero.

The following description will be made with reference to FIG. 3. After having performed reconstruction of the lanes 301, 302, 311, and 312 through resource reallocation, the resource management unit 204 acquires allocation of each resource registered to the resource allocation information 420. Then, the resource management unit 204 outputs, to the path switching control unit 203, information on the allocation of each resource registered to the resource allocation information 420.

The path switching control unit 203 is achieved by the service processor 21 exemplarily illustrated in FIG. 2 when executing firmware incorporated in the service processor 21. The path switching control unit 203 receives, from the resource management unit 204, inputting of the information on the allocation of each resource registered to the resource allocation information 420. Then, the path switching control unit 203 determines path setting at the path switching units 112 and 116 in accordance with the allocation of each resource. The determined path setting is path setting for bypassing a failed place. Then, the path switching control unit 203 switches the path switching units 112 and 116 in accordance with the determined path setting. When single-link resource reallocation is performed, a failed link is already deactivated, and thus the path switching control unit 203 does not have to stop the failed link at the path switching. However, in the inter-link resource reallocation, the shared link is operational. Thus, when the inter-link resource reallocation is performed, the path switching control unit 203 outputs an instruction to stop the shared link to the interconnect control circuit 12 and then performs the switching processing.

Figure 11:
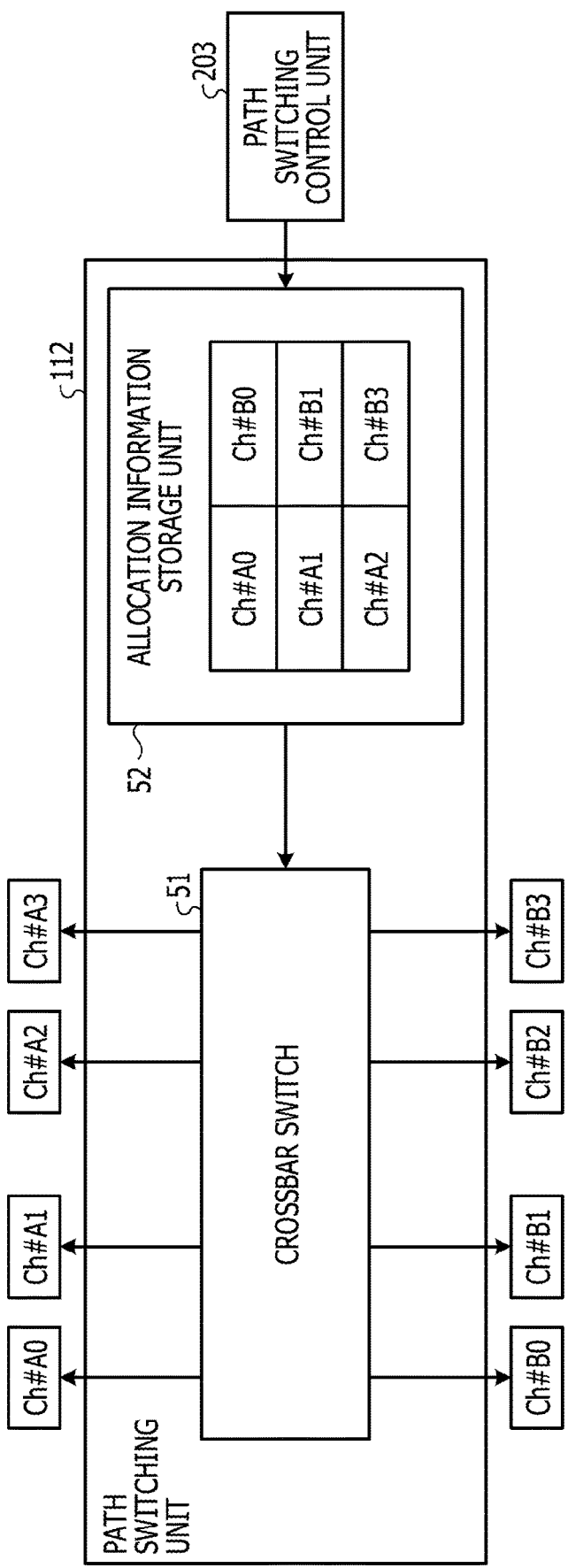
FIG. 11 is a configuration diagram of a path switching unit.

The following describes the path switching at the path switching units 112 and 116 in detail with reference to FIG. 11. FIG. 11 is a configuration diagram of the path switching unit. The following description will be made on an example with the path switching unit 112.

The path switching unit 112 includes a crossbar switch 51 and an allocation information storage unit 52. The path switching control unit 203 stores information on determined path setting in the allocation information storage unit 52. For example, as illustrated in the allocation information storage unit 52 in FIG. 11, the path switching control unit 203 registers, as the path setting information, combinations of the channels #A0 to #A2 and the channels #130, #B1, and #B3 coupled with each other, respectively. The crossbar switch 51 mutually couples the channels #A0 to #A3 and the channels #B0 to #B3 in accordance with the path setting information stored in the allocation information storage unit 52. In FIG. 11, information on the channel #A3 and the channel #B2 is not stored in the allocation information storage unit 52, and thus the crossbar switch 51 does not couple the channel #A3 and the channel #B2.

Then, after path switching at the path switching units 112 and 116, the path switching control unit 203 transmits, to the interconnect control circuit 12, an instruction to reinitialize the failed link or reinitialize the failed link and the shared link. The path switching control unit 203 and the resource management unit 204 each correspond to an exemplary "coupling switching unit".

Figure 12:
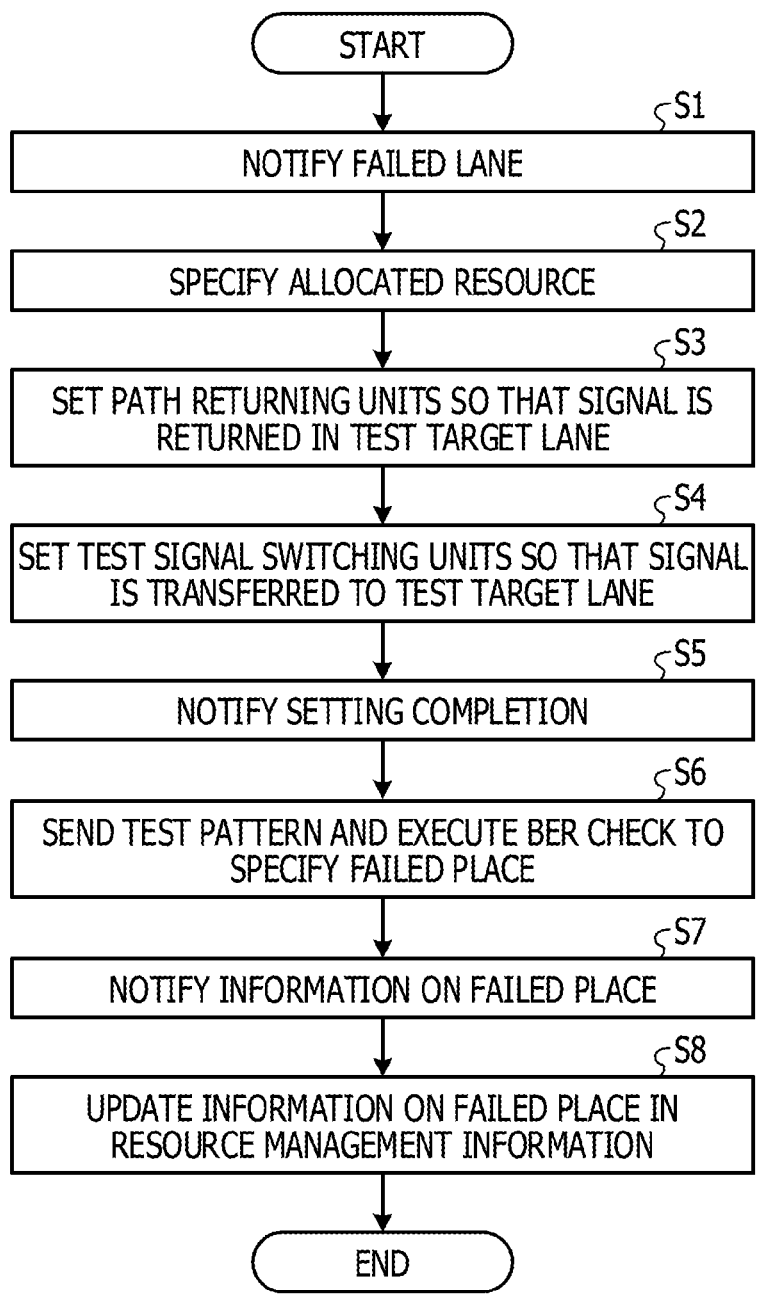
FIG. 12 is a flowchart of failed place specification processing performed by the inter-node communication device according to an embodiment.

The following describes the process of failed place specification processing performed by the inter-node communication device 2 according to the present embodiment with reference to FIG. 12. FIG. 12 is a flowchart of the failed place specification processing performed by the inter-node communication device according to the embodiment.

The interconnect control circuit 12 notifies the transmission test control unit 202 of a failed lane (step S1).

The transmission test control unit 202 receives the notification of the failed lane from the interconnect control circuit 12. Then, the transmission test control unit 202 determines a test target lane to be the failed lane of which the notification is received. Subsequently, the transmission test control unit 202 specifies, based on the resource allocation information 420 stored in the resource management unit 204, any resource allocated to the failed lane (step S2).

Subsequently, the transmission test control unit 202 sets the path returning units 114 and 118 so that a signal is returned in the test target lane (step S3).

Subsequently, the transmission test control unit 202 sets the test signal switching units 111 and 115 so that a signal is transferred from the transmission test execution unit 201 to the test target lane (step S4).

Then, the transmission test control unit 202 notifies the transmission test execution unit 201 of setting completion (step S5), and instructs the transmission test execution unit 201 to execute a test on the test target lane.

The transmission test execution unit 201 receives, from the transmission test control unit 202, the setting completion notification and the instruction to execute a test on the test target lane. Then, the transmission test execution unit 201 sends a signal including a test pattern to the test target lane. Thereafter, the transmission test execution unit 201 executes the BER check by using a returned signal to specify a failed place on the failed lane (step S6).

Thereafter, the transmission test execution unit 201 notifies the transmission test control unit 202 of information on the specified failed place. The transmission test control unit 202 notifies the resource management unit 204 of the information on the failed place acquired from the transmission test execution unit 201 (step S7).

The resource management unit 204 updates information on the failed place in the resource management information 410 (step S8). Specifically, the transmission test control unit 202 changes, to "Yes", the failure state of the failed place in the electric signal processing unit table 411 and the electro-optical conversion unit table 412 of the resource management information 410, and decreases the number of available resources corresponding to the failed place by one.

Figure 13A:
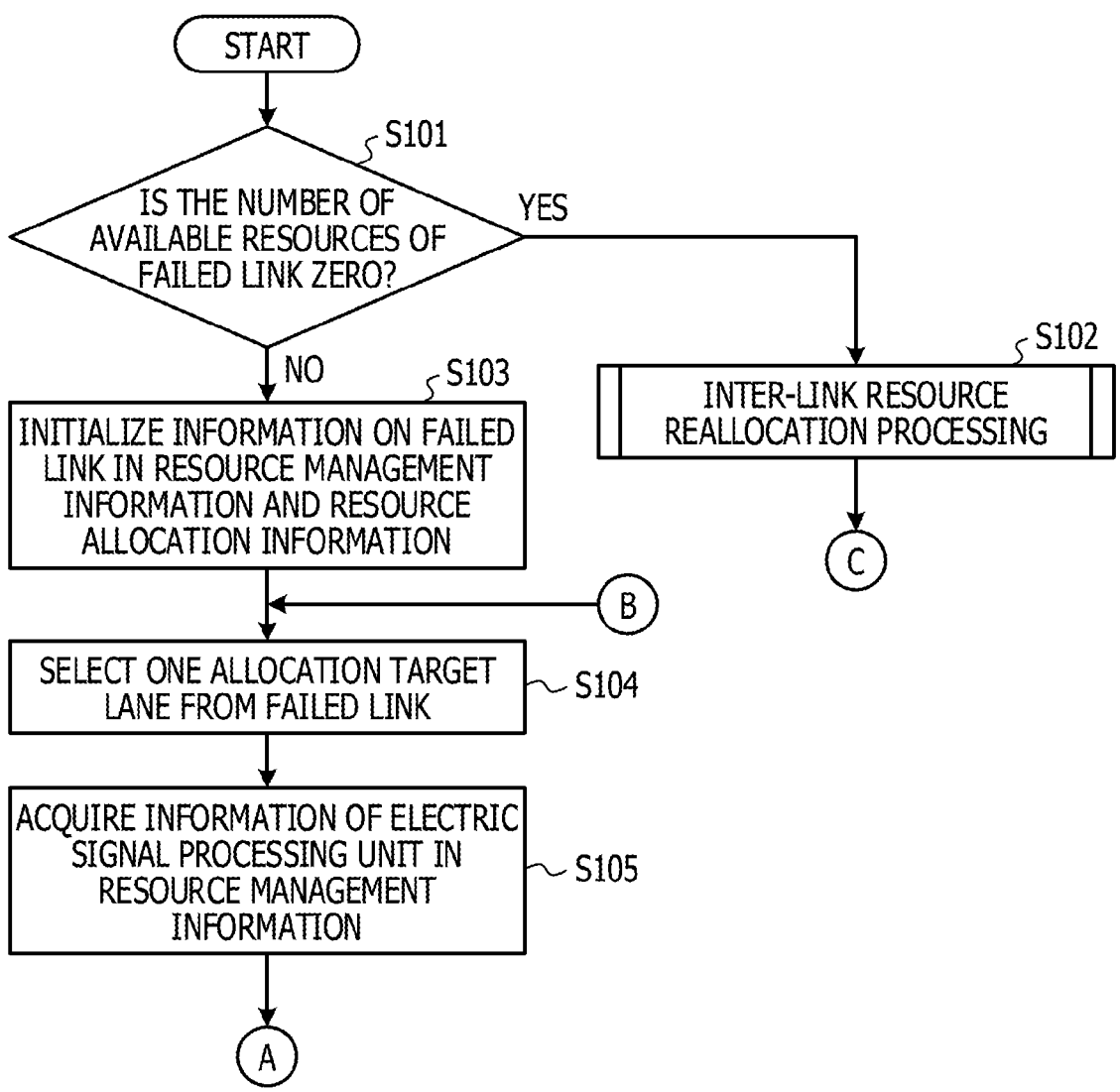
FIGS. 13A and 13B are flowcharts of resource reallocation processing performed by the inter-node communication device according to the embodiment.
Figure 13B:
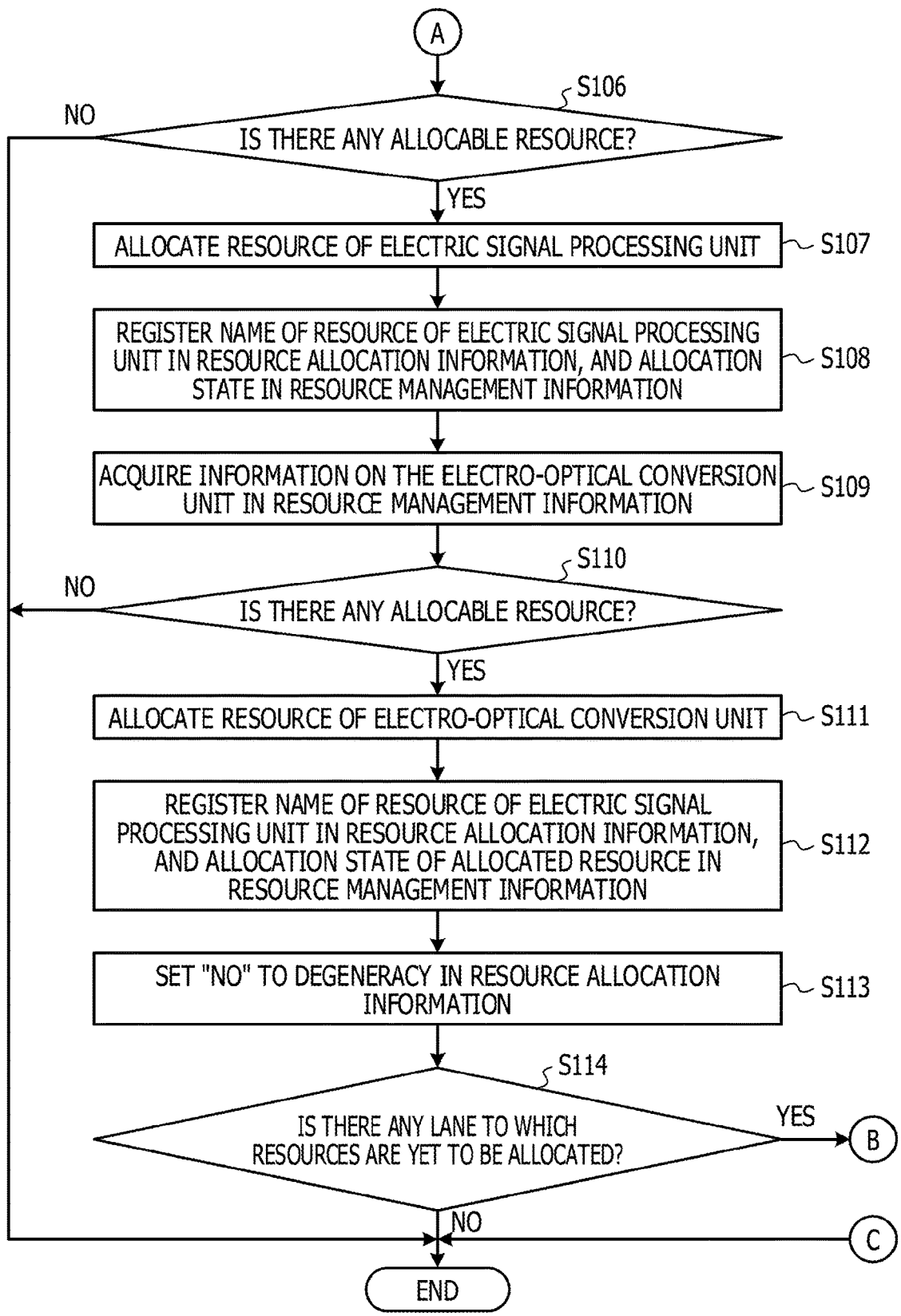

The following describes the process of the resource reallocation processing performed by the inter-node communication device 2 according to the present embodiment with reference to FIGS. 13A and 13B. FIGS. 13A and 13B are flowcharts of the resource reallocation processing performed by the inter-node communication device according to the embodiment. In the following description, the lanes 301, 302, 311, and 312, and any other lanes are referred to as "lanes 300" when not distinguished from each other.

The resource management unit 204 refers to the electric signal processing unit table 411 and the electro-optical conversion unit table 412 of the resource management information 410 to determine whether the number of available resources of a failed link including the failed lane is zero in any of the tables (step S101).

When the number of available resources is zero (Yes at step S101), the resource management unit 204 executes the inter-link the resource reallocation processing (step S102). Thereafter, the resource management unit 204 ends the resource reallocation processing.

When the number of available resources is not zero (No at step S101), the resource management unit 204 starts the single-link resource reallocation processing. First, the resource management unit 204 initializes information on the failed link in the resource management information 410 and the resource allocation information 420 (step S103).

Then, the resource management unit 204 selects, from among the lanes 300 included in the failed link, one allocation target lane to which resources are to be allocated (step S104).

Subsequently, the resource management unit 204 acquires, from the resource management information 410, information on the electric signal processing unit 113 in the resource management information 410 related to the failed link, in other words, information on resources of the failed link in the electric signal processing unit table 411 (step S105).

Subsequently, the resource management unit 204 determines whether the electric signal processing unit 113 has any allocable resource of the failed link, which suffers no failure and is yet to be allocated (step S106). When there is no resource yet to be allocated (No at step S106), the resource management unit 204 ends the resource reallocation processing.

When there is any resource yet to be allocated (Yes at step S106), the resource management unit 204 allocates the resource of the electric signal processing unit 113 to the allocation target lane (step S107).

Subsequently, the resource management unit 204 registers the name of the resource of the electric signal processing unit 113 allocated to the allocation target lane in the resource allocation information 420, and the allocation state of the allocated resource of the electric signal processing unit 113 in the resource management information 410 (step S108).

Subsequently, the resource management unit 204 acquires, from the resource management information 410, information on the electro-optical conversion unit 117 in the resource management information 410 related to the failed link, in other words, information on resources of the failed link in the electro-optical conversion unit table 412 (step S109).

Subsequently, the resource management unit 204 determines whether the electro-optical conversion unit 117 has any allocable resource of the failed link, which suffers no failure and is yet to be allocated (step 5110). When there is no resource yet to be allocated (No at step S110), the resource management unit 204 ends the resource reallocation processing.

When there is any resource yet to be allocated (Yes at step 5110), the resource management unit 204 allocates the resource of the electro-optical conversion unit 117 to the allocation target lane (step S111).

Subsequently, the resource management unit 204 registers the name of the resource of the electro-optical conversion unit 117 allocated to the allocation target lane in the resource allocation information 420, and the allocation state of the allocated resource of the electro-optical conversion unit 117 in the resource management information 410 (step S112).

Subsequently, the resource management unit 204 sets "No" to information on the degeneracy of the allocation target lane in the resource allocation information 420 (step S113).

Thereafter, the resource management unit 204 determines whether the failed link includes any lane 300 to which resources are yet to be allocated (step S114). When there is any lane 300 to which resources are yet to be allocated (Yes at step S114), the resource management unit 204 returns to step S104.

When there is no lane 300 to which resources are yet to be allocated (No at step S114), the resource management unit 204 ends the resource reallocation processing.

Figure 14A:
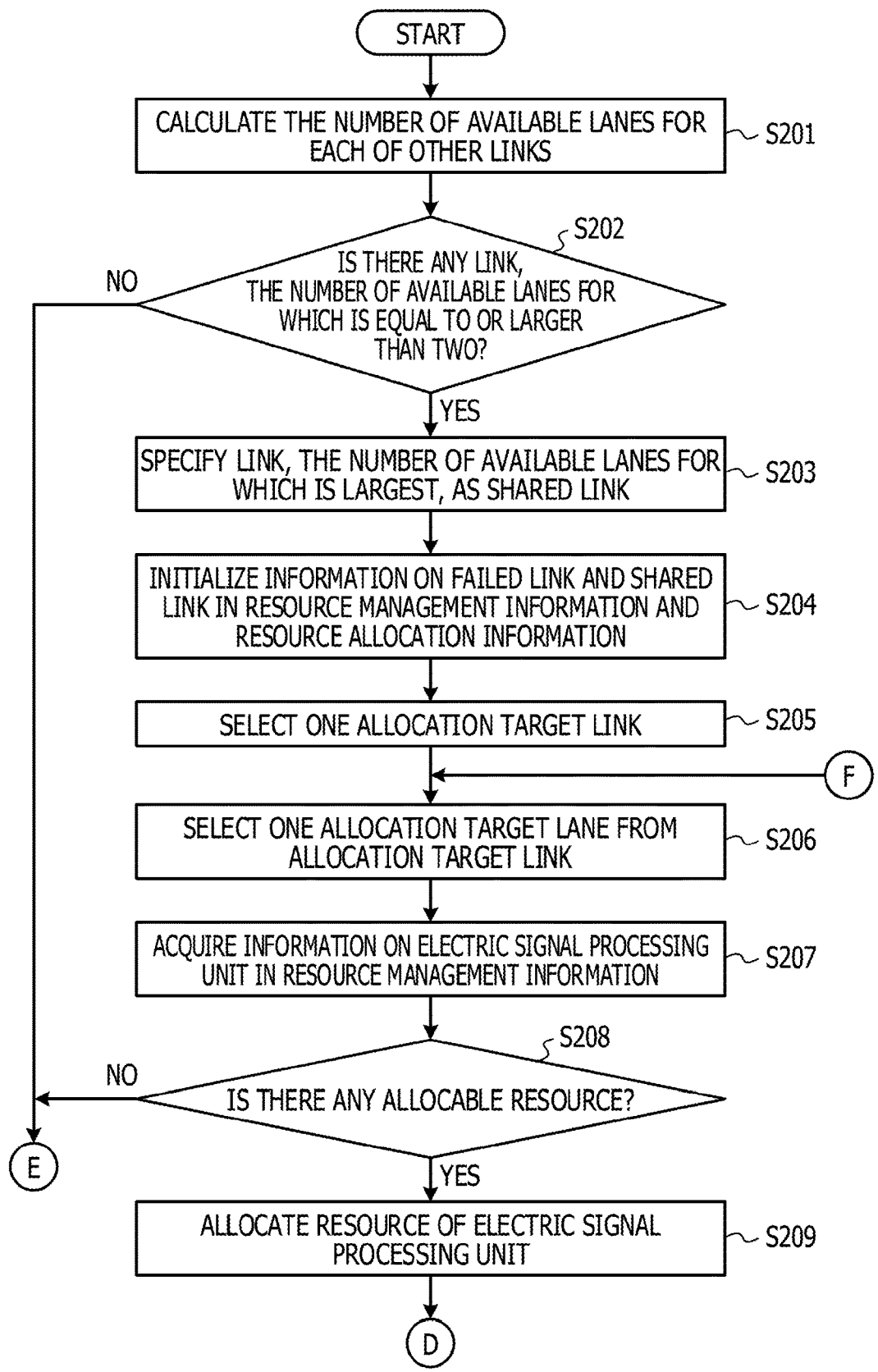
FIGS. 14A and 14B are flowcharts of inter-link resource reallocation processing performed by the inter-node communication device according to the embodiment.
Figure 14B:
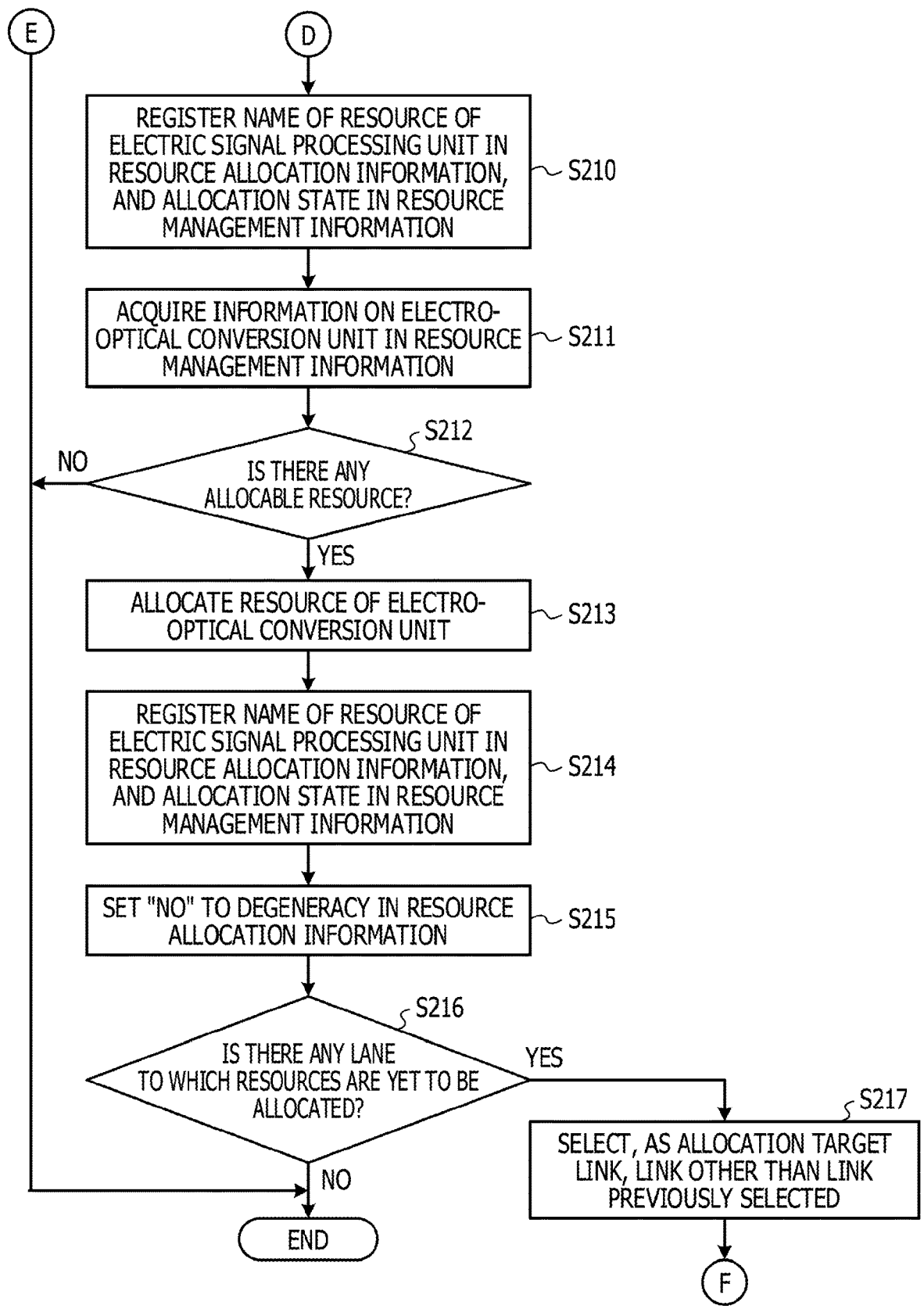

The following describes the process of the inter-link the resource reallocation processing performed by the inter-node communication device 2 according to the present embodiment with reference to FIGS. 14A and 14B. FIGS. 14A and 14B are flowcharts of the inter-link the resource reallocation processing performed by the inter-node communication device according to the embodiment. In this example, the links ##0 and ##1, and any other links are referred to as "links ##n" when not distinguished from each other. The lanes 301, 302, 311, and 312, and any other lanes are referred to as "lanes 300" when not distinguished from each other.

The resource management unit 204 calculates the number of available lanes for each of the other links ##n other than a failed link based on the resource management information 410 (step S201).

Subsequently, the resource management unit 204 determines whether there is any link ##n, the number of available lanes for which is equal to or larger than two (step S202). When there is no link ##n, the number of available lanes for which is equal to or larger than two (No at step S202), the resource management unit 204 ends the resource reallocation processing.

When there is any link ##n, the number of available lanes for which is equal to or larger than two (Yes at step S202), the resource management unit 204 specifies, as the shared link, a link ##n, the number of available lanes for which is largest among the links ##n, the number of available lanes for each of which is equal to or larger than two (step S203).

Subsequently, the resource management unit 204 initializes information on the failed link and the shared link in the resource management information 410 and the resource allocation information 420 (step S204).

Then, the resource management unit 204 selects one allocation target link from among the failed link and the shared link (step S205).

Then, the resource management unit 204 selects, from among the lanes 300 included in the failed link or the shared link, one allocation target lane to which resources are to be allocated (step S206).

Subsequently, the resource management unit 204 acquires information on the electric signal processing unit 113 in the resource management information 410 related to the failed link and the shared link (step S207). In other words, the resource management unit 204 acquires information on resources of the failed link and the shared link in the electric signal processing unit table 411 from the resource management information 410.

Subsequently, the resource management unit 204 determines whether the electric signal processing unit 113 has any allocable resource of the failed link or the shared link, which suffers no failure and is yet to be allocated (step S208). When there is no resource yet to be allocated (No at step S208), the resource management unit 204 ends the resource reallocation processing.

When there is any resource yet to be allocated (Yes at step S208), the resource management unit 204 allocates the resource of the electric signal processing unit 113 to the allocation target lane (step S209).

Subsequently, the resource management unit 204 registers the name of the resource of the electric signal processing unit 113 allocated to the allocation target lane in the resource allocation information 420, and the allocation state of the allocated resource of the electric signal processing unit 113 in the resource management information 410 (step S210).

Subsequently, the resource management unit 204 acquires information on the electro-optical conversion unit 117 in the resource management information 410 related to the failed link and the shared link (step S211). In other words, the resource management unit 204 acquires information on resources of the failed link and the shared link in the electro-optical conversion unit table 412 from the resource management information 410.

Subsequently, the resource management unit 204 determines whether the electro-optical conversion unit 117 has any allocable resource of the failed link or the shared link, which suffers no failure and is yet to be allocated (step S212). When there is no resource yet to be allocated (No at step S212), the resource management unit 204 ends the resource reallocation processing.

When there is any resource yet to be allocated (Yes at step S212), the resource management unit 204 allocates the resource of the electro-optical conversion unit 117 to the allocation target lane (step S213).

Subsequently, the resource management unit 204 registers the name of the resource of the electro-optical conversion unit 117 allocated to the allocation target lane in the resource allocation information 420, and the allocation state of the allocated resource of the electro-optical conversion unit 117 in the resource management information 410 (step S214).

Subsequently, the resource management unit 204 sets "No" to information on the degeneracy of the allocation target lane in the resource allocation information 420 (step S215).

Thereafter, the resource management unit 204 determines whether the failed link or the shared link includes any lane 300 to which resources are yet to be allocated (step S216). When there is any lane 300 to which resources are yet to be allocated (Yes at step S216), the resource management unit 204 selects, as the allocation target link, a link ##n other than the link ##n previously selected as the allocation target link (step S217). Thereafter, the resource management unit 204 returns to step S206.

When there is no lane 300 to which resources are yet to be allocated (No at step S216), the resource management unit 204 ends the resource reallocation processing.

As described above, when it is possible to form a lane coupling nodes by using resources allocated to a failed link, the inter-node communication device according to the present embodiment reconstructs the node-coupling lane by using any resource in the failed link. When it is difficult to form a node -coupling lane by using resources allocated to the failed link, the inter-node communication device uses resources used by any other link to reconstruct node-coupling lanes in the failed link and the other link. In this manner, when failure of the optical module is detected at all lanes in a link, it is possible to avoid deactivation of the link and continue communication between nodes. Accordingly, it is possible to avoid encumbrance to execution of a job that specifies a predetermined shape of nodes, thereby improving system availability.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing apparatus comprising:
   a first node device;
   a second node device; and
   a control device configured to control data transmission between the first node device and the second node device, the control device being coupled to the first node device through a first path group including a plurality of paths and being coupled to the second node device through a second path group including a plurality of paths, the control device including:
   a memory; and
   a processor coupled to the memory and configured to:
   perform a communication test of the first path group and the second path group; and
   when a first failure is detected in a first path in the first path group in the communication test, couple a third path other than the first path in the first path group with the first node device, couple a second path in the second path group with the second node device, and couple the third path and the second path with each other;
   when a second failure is detected in the second path in the communication test, couple the third path with the first node device, couple a fourth path other than the second path in the second path group with the second node device, and couple the third path and the fourth path with each other;
   transmit, to the first node device, a first instruction signal instructing the first node device to couple the third path and the first node device with each other, and
   transmit, to the second node device, a second instruction signal instructing the second node device to couple the fourth path and the second node device with each other.

2. The information processing apparatus according to claim 1, wherein the first path group and the second path group are included in a plurality of lanes coupling the first node device and the second node device with each other.

3. The information processing apparatus according to claim 2, wherein the processor is configured to, when the failure occurs in a first lane in the plurality of lanes, change a coupling between the first node device and the first path group, coupling between the first path group and the second path group, and coupling between the second path group and the second node device so that a first coupling point of the first node device and a second coupling point of the second node device are coupled with each other.

4. The information processing apparatus according to claim 2, wherein
   the first node device and the second node device are coupled with each other through a plurality of links,
   each of the plurality of links includes the plurality of lanes, and
   the processor is configured to:
   when the first failure occurs in all of the plurality of lanes included in a first link in the plurality of links, couple the first node device and the second node device with each other through at least one of the plurality of lanes included in a second link in the plurality of links.

5. The information processing apparatus according to claim 1, wherein the processor is configured to perform the communication test by inputting a first signal through a first end of the first path group, inputting a first output signal output from a second end of the first path group to the second end, acquiring a second output signal output from the first end, inputting a second signal output from a third end of the second path group, inputting a third output signal to the third end output from a fourth end of the second path group, and acquiring a fourth output signal output from the third end.

6. The information processing apparatus according to claim 1, wherein the processor is configured to:
   receive an electric signal output from the first path group,
   convert the electric signal into an optical signal, and
   output the optical signal to the second path group.

7. A method using a control device configured to control data transmission between the first node device and the second node device, the control device being coupled to the first node device through a first path group including a plurality of paths and being coupled to the second node device through a second path group including a plurality of paths, the method comprising:
   performing a communication test of the first path group and the second path group;
   when a first failure is detected in a first path in the first path group in the communication test, coupling a third path other than the first path in the first path group with the first node device, coupling a second path in the second path group with the second node device, and coupling the third path and the second path with each other;
   when a second failure is detected in the second path in the communication test, coupling the third path with the first node device, coupling a fourth path other than the second path in the second path group with the second node device, and coupling the third path and the fourth path with each other;
   transmitting, to the first node device, a first instruction signal instructing the first node device to couple the third path and the first node device with each other; and
   transmitting, to the second node device, a second instruction signal instructing the second node device to couple the fourth path and the second node device with each other.

8. The method according to claim 7, wherein the first path group and the second path group are included in a plurality of lanes coupling the first node device and the second node device with each other.

9. The method according to claim 8, wherein when the failure occurs in a first lane in the plurality of lanes, changing a coupling between the first node device and the first path group, coupling between the first path group and the second path group, and coupling between the second path group and the second node device so that a first coupling point of the first node device and a second coupling point of the second node device are coupled with each other.

10. The method according to claim 8, wherein
the first node device and the second node device are coupled with each other through a plurality of links,
each of the plurality of links includes the plurality of lanes, and
the method further comprising:
when the first failure occurs in all of the plurality of lanes included in a first link in the plurality of links, coupling the first node device and the second node device with each other through at least one of the plurality of lanes included in a second link in the plurality of links.

11. The method according to claim 7, wherein performing the communication test by inputting a first signal through a first end of the first path group, inputting a first output signal output from a second end of the first path group to the second end, acquiring a second output signal output from the first end, inputting a second signal output from a third end of the second path group, inputting a third output signal to the third end output from a fourth end of the second path group, and acquiring a fourth output signal output from the third end.

12. The method according to claim 7, further comprising:
receiving an electric signal output from the first path group;
converting the electric signal into an optical signal; and
outputting the optical signal to the second path group.

13. A non-transitory computer-readable storage medium storing a program that causes a processor included in a control device to execute a process, the control device configured to control data transmission between the first node device and the second node device, the control device being coupled to the first node device through a first path group including a plurality of paths and being coupled to the second node device through a second path group including a plurality of paths, the method comprising:
performing a communication test of the first path group and the second path group;
when a first failure is detected in a first path in the first path group in the communication test, coupling a third path other than the first path in the first path group with the first node device, coupling a second path in the second path group with the second node device, and coupling the third path and the second path with each other;
when a second failure is detected in the second path in the communication test, coupling the third path with the first node device, coupling a fourth path other than the second path in the second path group with the second node device, and coupling the third path and the fourth path with each other;
transmitting, to the first node device, a first instruction signal instructing the first node device to couple the third path and the first node device with each other; and
transmitting, to the second node device, a second instruction signal instructing the second node device to couple the fourth path and the second node device with each other.

14. The non-transitory computer-readable storage medium according to claim 13, wherein the first path group and the second path group are included in a plurality of lanes coupling the first node device and the second node device with each other.

* * * * *